US008461495B2

(12) United States Patent  
Gerhardinger

(10) Patent No.: US 8,461,495 B2  
(45) Date of Patent: Jun. 11, 2013

(54) HEATED GLASS PANEL FRAME WITH ELECTRONIC CONTROLLER AND TRIAC

(75) Inventor: Peter F. Gerhardinger, Maumee, OH (US)

(73) Assignee: Engineered Glass Products, LLC., Chicago, IL (US)

( * ) Notice: Subject to any disclaimer, the term of this patent is extended or adjusted under 35 U.S.C. 154(b) by 1600 days.

(21) Appl. No.: 11/200,724

(22) Filed: Aug. 10, 2005

(65) Prior Publication Data

US 2005/0269312 A1 Dec. 8, 2005

Related U.S. Application Data

(63) Continuation-in-part of application No. 10/256,391, filed on Sep. 27, 2002, now Pat. No. 7,265,323.

(60) Provisional application No. 60/339,409, filed on Oct. 26, 2001, provisional application No. 60/369,962, filed on Apr. 4, 2002.

(51) Int. Cl.
*H05B 3/44* (2006.01)
*H05B 3/06* (2006.01)

(52) U.S. Cl.
USPC .......................................... 219/543; 219/522

(58) Field of Classification Search
USPC ............... 219/543, 200, 385, 522, 203, 541, 219/549, 509, 202, 520, 521, 546–548; 361/18
See application file for complete search history.

(56) References Cited

U.S. PATENT DOCUMENTS

| | | | |
|---|---|---|---|
| 2,235,681 A | | 3/1941 | Haven et al. |
| 3,609,293 A | * | 9/1971 | Stewart et al. ................ 219/200 |
| 3,731,354 A | | 5/1973 | Rayburn |
| 3,876,862 A | * | 4/1975 | Newman et al. ............. 219/509 |
| 3,935,422 A | | 1/1976 | Barnes et al. |
| 3,968,342 A | | 7/1976 | Inaba |
| 3,996,398 A | | 12/1976 | Manfredi |
| 4,017,661 A | | 4/1977 | Gillery |
| 4,052,588 A | | 10/1977 | Nakamura et al. |
| D246,985 S | | 1/1978 | Popma et al. |
| 4,100,398 A | | 7/1978 | Levin |

(Continued)

FOREIGN PATENT DOCUMENTS

| | | |
|---|---|---|
| DE | 41 36 134 A1 | 5/1993 |
| DE | 100 16 399 A1 | 4/2001 |

(Continued)

OTHER PUBLICATIONS

U.S. Appl. No. 11/200,724, filed Aug. 10, 2005, Gerhardinger et al.

*Primary Examiner* — Sang Paik

(74) *Attorney, Agent, or Firm* — Marshall & Melhorn LLC

(57) ABSTRACT

The present invention places an electronic controller and/or a triac in a frame, a cover, a chase, or a mounting member of a heated glass panel assembly, where the panel has a conductive coating dispose on it. By placing the controller in the panel frame, the cover, the chase, or the mounting member, field wiring of the panel assembly is greatly reduced, wire lengths are standardized, production glazing, wiring, and pre-testing are facilitated, and installation time and complexity are minimized. By placing the triac in thermal contact with the panel frame, the cover, the chase, or the mounting member, the heat from the triac may be used to complement the heat supplied by the assembly.

18 Claims, 33 Drawing Sheets

U.S. PATENT DOCUMENTS

| | | | |
|---|---|---|---|
| 4,117,309 A | | 9/1978 | Cayley |
| 4,127,763 A | | 11/1978 | Roselli |
| 4,203,198 A | | 5/1980 | Hackett et al. |
| 4,248,015 A | | 2/1981 | Stromquist et al. |
| D258,527 S | | 3/1981 | Souhan et al. |
| 4,260,876 A | | 4/1981 | Hochheiser |
| 4,297,391 A | | 10/1981 | Lindmayer |
| 4,298,789 A | | 11/1981 | Eichelberger et al. |
| 4,331,703 A | | 5/1982 | Lindmayer |
| 4,440,822 A | | 4/1984 | Gordon |
| 4,453,669 A | | 6/1984 | Karla et al. |
| 4,459,470 A | * | 7/1984 | Shlichta et al. ............ 219/522 |
| 4,511,600 A | | 4/1985 | Leas |
| 4,552,611 A | | 11/1985 | Dery et al. |
| 4,641,013 A | | 2/1987 | Dunnigan et al. |
| 4,665,304 A | | 5/1987 | Spencer |
| RE32,616 E | | 3/1988 | Graham |
| 4,765,928 A | | 8/1988 | Thakur |
| D298,771 S | | 11/1988 | DeMars |
| 4,804,822 A | | 2/1989 | Schreder |
| 4,808,490 A | | 2/1989 | Tsukuda et al. |
| 4,835,071 A | | 5/1989 | Williams et al. |
| D302,460 S | | 7/1989 | Gibson |
| 4,875,592 A | | 10/1989 | Waller |
| 4,885,187 A | | 12/1989 | Koenig |
| 4,927,995 A | | 5/1990 | Lovett et al. |
| D324,620 S | | 3/1992 | Chalot |
| D338,794 S | | 8/1993 | Wilsker |
| 5,256,858 A | | 10/1993 | Tomb |
| 5,319,301 A | | 6/1994 | Callahan et al. |
| 5,406,049 A | | 4/1995 | Reiser et al. |
| 5,414,240 A | | 5/1995 | Carter et al. |
| 5,543,601 A | | 8/1996 | Bartrug et al. |
| 5,548,100 A | | 8/1996 | Miller |
| 5,569,403 A | | 10/1996 | Swanson et al. |
| 5,577,158 A | | 11/1996 | Kallgren et al. |
| 5,592,073 A | | 1/1997 | Redlich |
| 5,616,263 A | | 4/1997 | Hyllberg |
| 5,624,591 A | * | 4/1997 | Di Trapani ............ 219/522 |
| 5,642,462 A | | 6/1997 | Huff |
| 5,737,852 A | | 4/1998 | Shukla |
| RE35,834 E | | 7/1998 | Miller |
| 5,852,284 A | | 12/1998 | Teder et al. |
| 5,932,128 A | | 8/1999 | Dishop |
| 5,940,579 A | | 8/1999 | Kallgren et al. |
| 5,959,816 A | * | 9/1999 | Wood et al. ............ 361/18 |
| 5,965,246 A | | 10/1999 | Guisellin et al. |
| 5,990,449 A | | 11/1999 | Sugiyama et al. |
| 6,005,227 A | | 12/1999 | Pappas |
| 6,008,473 A | | 12/1999 | Gillner et al. |
| 6,031,208 A | | 2/2000 | Witt |
| 6,037,572 A | | 3/2000 | Coates et al. |
| 6,051,820 A | | 4/2000 | Poix et al. |
| 6,065,424 A | | 5/2000 | Shacham-Diamand et al. |
| 6,072,165 A | | 6/2000 | Feldman |
| 6,111,224 A | * | 8/2000 | Witt ............ 219/385 |
| 6,144,017 A | * | 11/2000 | Millett et al. ............ 219/522 |
| 6,207,522 B1 | | 3/2001 | Hunt et al. |
| 6,262,396 B1 | | 7/2001 | Witt |
| 6,303,911 B1 | | 10/2001 | Welch, Jr. |
| 6,320,159 B1 | * | 11/2001 | Topp ............ 219/203 |
| 6,320,164 B2 | | 11/2001 | Millett |
| 6,563,094 B2 | | 5/2003 | Kochman et al. |
| 6,620,645 B2 | | 9/2003 | Chandra et al. |
| 6,791,065 B2 | | 9/2004 | Bartrug et al. |
| 2003/0127452 A1 | | 7/2003 | Gerhardinger et al. |

FOREIGN PATENT DOCUMENTS

| | | |
|---|---|---|
| EP | 1 030 130 A1 | 8/2000 |
| GB | 2 248 160 A | 3/1992 |
| WO | WO 96/27271 A1 | 9/1996 |
| WO | WO 01/56334 A1 | 8/2001 |

* cited by examiner

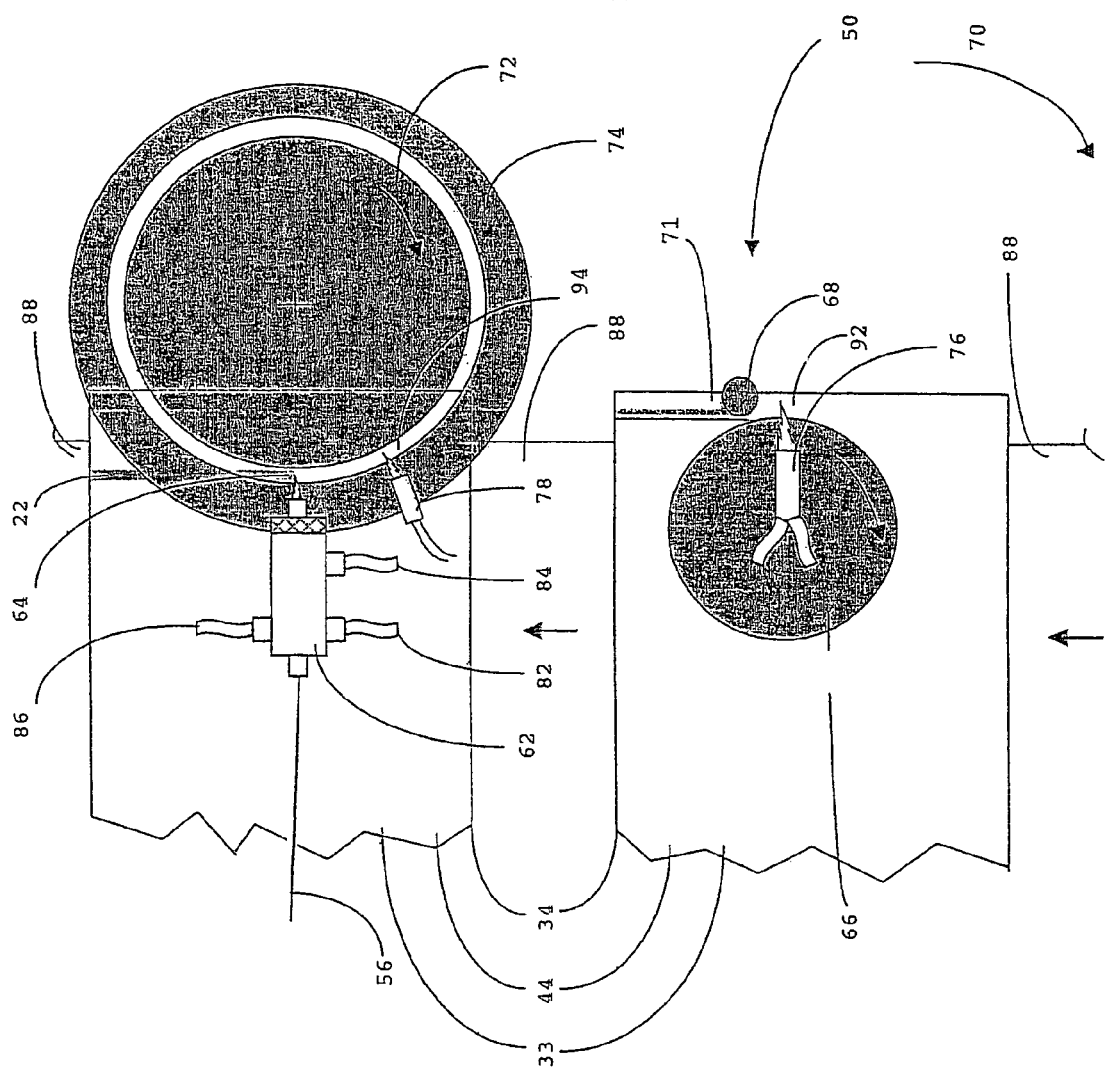

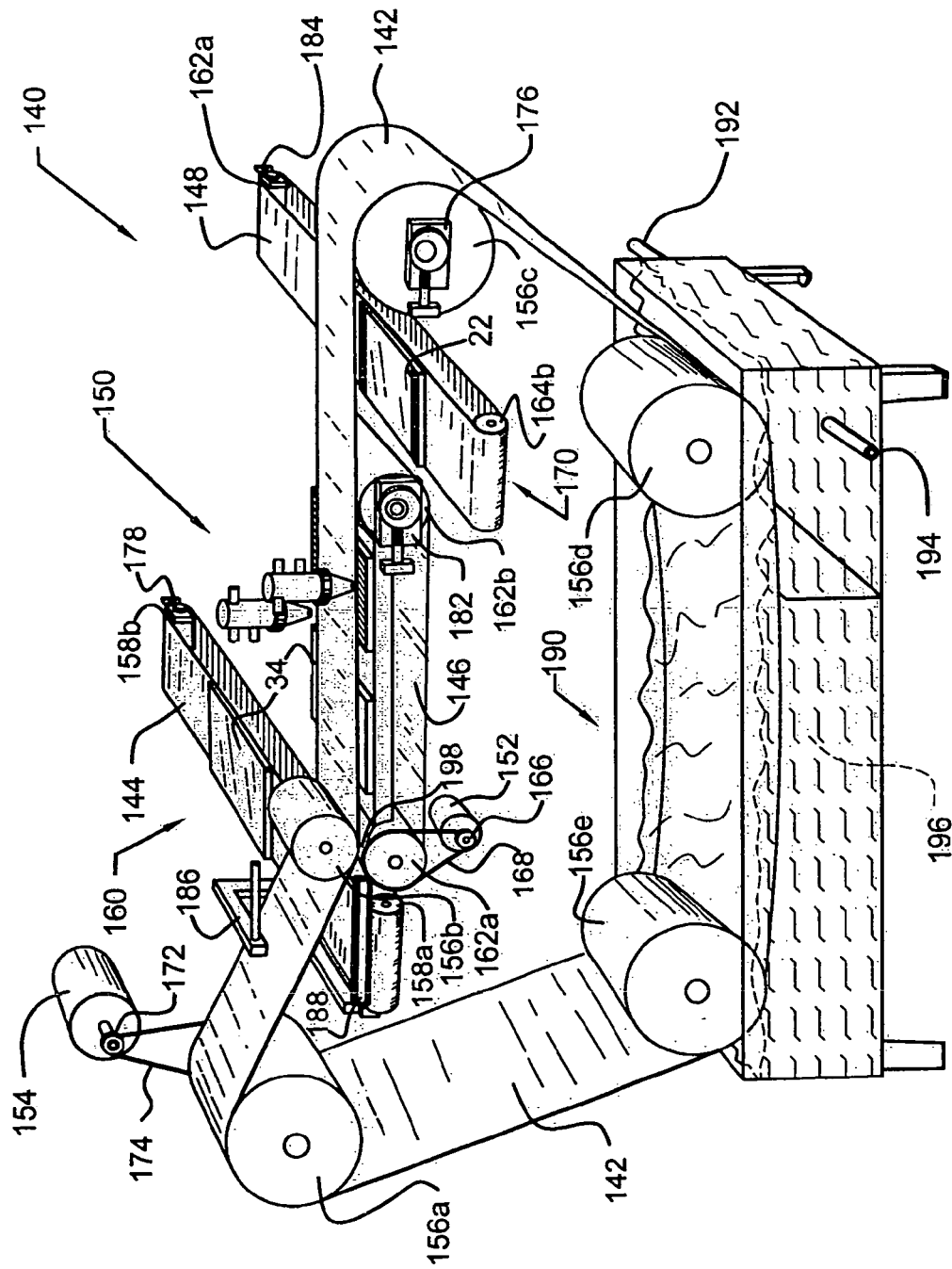

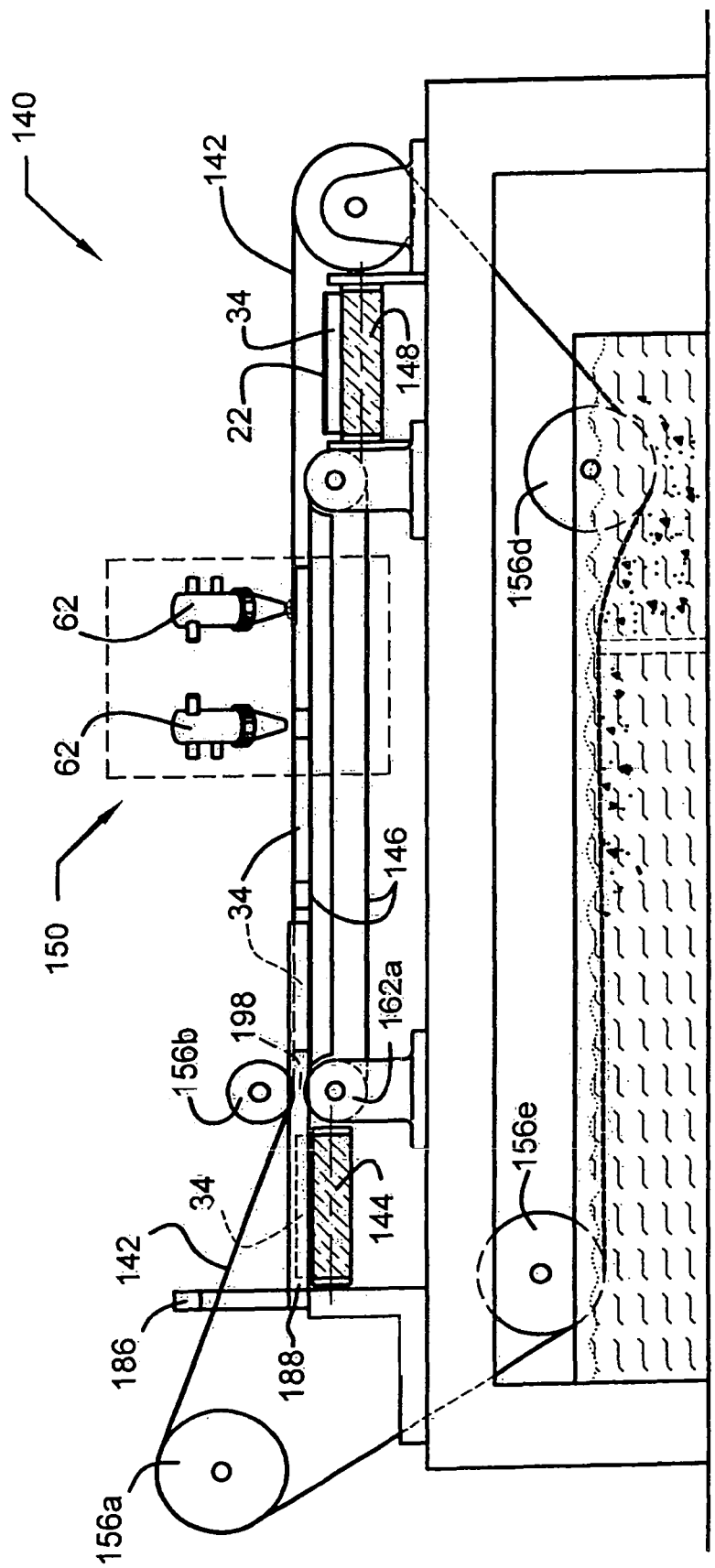

HEATED GLASS PANEL FRAME WITH ELECTRONIC CONTROLLER AND TRIAC

RELATED APPLICATIONS

This application is a continuation-in-part application and claims benefit of U.S. patent application Ser. No. 10/256,391, filed Sep. 27, 2002 now U.S. Pat. No. 7,265,323, which claims the benefit of U.S. Provisional Patent Applications Ser. No. 60/339,409, filed Oct. 26, 2001, and Ser. No. 60/369,962, filed Apr. 4, 2002. U.S. patent application Ser. No. 10/256,391 is incorporated herein in its entirety.

BACKGROUND OF THE INVENTION

The present invention generally relates to a heated glass panel that utilizes an electronic controller and/or a triac.

At the present time, heating, cooking, moisture control, and the electrical control of such processes and activities do not take full advantage of the potential of the use of coated glass. In general, utilizing thin-film coatings to produce heat in a glass panel is an established concept. However, in the past, the film deposition techniques, such as those used in spray coating, were not precise, which resulted in non-uniform coatings and consequently imprecise heating. Recently, the depositing of the coatings has improved, for example, through the use of chemical vapor deposition (CVD), but the electrical control of and connectivity to the coatings has not.

An application of heated glass that has seen these changes over the last thirty years is, for example, the commercial refrigerator and freezer doors in supermarkets, where a tin oxide coating is disposed on one of the interior surfaces of an IG panel and where an electric current is dissipated in the tin oxide to provide heat to raise the glass temperature above the dew point. On such doors, the heat eliminates the formation of condensation so that employees and customers can view the refrigerator/freezer contents after individuals have opened and closed the doors.

However, non-uniform coatings and traditional electrical control methods result in wasted energy, produce hot and cold spots on the glass, and can result in safety hazards should the glass break and expose the current-carrying film. This approach could benefit from control opportunities that exist using the current state of control technology.

For transportation applications, where heated windows and mirrors provide drivers and occupants of land, air, and water vehicles unimpeded viewing by the removal of condensation, breakage of the electrically heated glass panels can also result in electrical safety problems. Underwriters Laboratories (UL) has expressed interest in improving the breakage of electrically heated glass panels and consequently the exposure of live electrical conductors within the glass.

In convenience stores and delicatessens, sandwiches and other food items are kept warm in glass enclosed food warmers, through the use of base electrical element heaters. The use of glass enclosures does allow the contents to be seen, but the use of only base electrical ribbon element heaters does not allow for radiant heating techniques that would be advantageous for the warming of food items from an area above the food items.

Commercial buildings, sports stadium skyboxes, sloped glazing in atria, canopies, and general fenestration applications, could benefit from the use of electrically heated glass panels, but the underlying reason for the reluctance to adopt these technologies in architectural applications is the lack of an integrated connection circuit and a systems approach to these applications. Expanding the adoption of these technologies, however, is hampered by the complexity of safely, reliably, and cost effectively combining glass and electricity.

There have been many methods advocated to electrically control heated glass panels. Among them are: direct connection to 120V AC power, use of step-down transformers, resistor-capacitor (RC) networks, triacs, and control circuits that directly drive resistive loads. All of these approaches have their benefits and also their disadvantages.

Some of the problems that must be overcome by the electrical controls are: (a) electrical shock potential, (b) circuitry components releasing significant heat to the overall system, when cooling is desired, (c) overload of the integrated connection circuits that supply the power to the panels, (d) bulkiness of the parts used in the control method, (e) lack of mounting space for the parts, (f) electrical interference generated by the control method, (g) lack of predictability and complexity of the control method, and (h) overall serviceability and costs.

The RC network approach that is taught in U.S. Pat. No. 5,852,284 to Teder et al. uses an RC circuit in series with the conductive coating on the glass to match the power supply with the characteristics of the glass assembly. Typically the value of the capacitor can be chosen for the desired power density via known electrical engineering calculations. In this method, the capacitor functions by changing the phase angle between the voltage and current of the applied AC voltage, hence regulating the power dissipation.

Disadvantages of this method are that capacitors of the required value are: (1) physically large and may be expensive, (2) when a capacitor fails, the full line voltage may be applied across the coated glass, (3) there is no integrated protection using such a method, so over-current protection must be provided, (4) handling many different applications is problematic, such that either a stock of a large number of different values of capacitors would be required or a large number of series-parallel networks must be constructed, which can also complicate the issues of required space and cost, and (5) the varying electrical phase angle may present power quality problems.

The use of triacs has shown promise as a way to vary the current that is applied to electrically coated sheets of glass. Examples of triac use are U.S. Pat. No. 4,260,876 to Hochheiser and U.S. Pat. No. 5,319,301 to Callahan et al. However, this use must overcome the negative effects of the triacs generating high peak currents, high harmonic distortion, and electromagnetic interference (EMI).

The use of electrical control circuits to operate the triacs, which in turn controls the current through the electrically conductive heated glass panel assembly and control systems, has the potential to minimize these negative effects, but to-date it has not been able to accomplish that task. Consequently, the application of triacs has not fully been able to solve the aforementioned problems in the control of electrically conductive heated glass panel assembly systems.

Also, the interconnections between the parts of an electrically conductive heated glass panel assembly and control system have typically been treated as individual parts and not as part of an overall system. In some cases, the bus bars have been screen-printed or fired conductive silver frits. These are difficult and expensive to print and difficult to solder external leads to, where special solder is required.

Further, various metallic tapes, including copper, have been attached to glass using adhesives but these connections exhibit poor adhesion to the glass. Also, rigid electrical terminations at the edge of the glass result from these methods of applying the bus bars, which makes them vulnerable to mechanical flexing, can expose them to condensation, and typically are expensive.

U.S. Pat. No. 2,235,681 to Haven et al., teaches the attaching of metal bus bars to a glass sheet as it applies to structural solder elements but not for electronic control systems.

Producers of crystalline solar cell technology (also referred to herein as photovoltaic technology) have been seeking ways to deposit metal-on-glass.

U.S. Pat. No. 6,065,424 to Shacham-Diamand et al., teaches thin metal film coatings sprayed onto glass by the use of an aqueous solution and subsequent annealing of the coatings. In U.S. Pat. No. 4,511,600 to Leas, a conductive metal grid is deposited atop a crystalline solar cell by the use of a mask and orifices (without the use of gas or air pressure to impart dispersion or velocity to the metal particles). The '600 patent also advocates the use of a powdered metal that is heated to a molten temperature in a refractory crucible.

In U.S. Pat. No. 4,331,703 to Lindmayer, a conductive metal is flame sprayed onto a silicon solar cell. In U.S. Pat. No. 4,297,391, also to Lindmayer, particles of a material are formed at a temperature in excess of the alloying temperature of the material and the silicon, and then the two are sprayed onto the surface of the glass at a distance, which causes the material and the silicon to firmly adhere to the surface. The '391 patent also teaches the use of a mask.

Currently, the control of electricity to electrically conductive glass panels centers primarily on control of the heating elements and not on monitoring system parts or the entire heating system for safety, power matching, or the like. For wiring installation purposes of the glass panels, it is common for holes to be drilled in the glass panels at the time of manufacturing and in the framework at the time of installation as well as for termination of wiring that is done in the field.

When the assembly of the electrical panels is completed, some of the controls, wiring, and associated parts are visible to users of these panel systems. Since power supply matching for each application is statically performed, the changing of system variables after manufacturing is, at best, cumbersome, while monitoring of system operating conditions is nearly nonexistent.

Termination of system wiring to existing facility electrical services, as well as on-site glazing operations, is not done with a total systems approach in mind. Thus those skilled in the art continued to seek a solution to the problem of how to provide a better electrically conductive heated glass panel assembly and control system, and a method for producing the panels.

SUMMARY OF THE INVENTION

The present invention relates to a heated glass panel with a frame, a cover, a chase, or a mounting member having an electronic controller disposed therein, and the heated glass panel having a conductive coating disposed thereon. In addition, a triac that is in thermal contact with the frame, the cover, the chase, or the mounting member may be utilized to complement the heat supplied by the panels.

Further objects and advantages of the present invention will be apparent from the following description and appended claims, reference being made to the accompanying drawings forming a part of a specification, wherein like reference characters designate corresponding parts of several views.

BRIEF DESCRIPTION OF THE DRAWINGS

FIG. 4b is a cross sectional view of an electrically conductive heated glass panel and the base setting block in a fully clasped connection position in accordance with FIG. 4a;

FIG. 4c is a perspective view of an electrically conductive heated glass panel and the connection clip in a fully clasped connection position in accordance with FIG. 4a;

FIG. 10a is a diagramatic view of a circularly rotating heating head and mask apparatus in accordance with the present invention;

FIG. 10c is a perspective view of a belt based inline heating head and mask apparatus in accordance with the present invention;

FIG. 10e is a side plan view of the belt based inline heating head and mask apparatus of FIG. 10c;

DETAILED DESCRIPTION OF THE PREFERRED EMBODIMENT

Figure 1A:
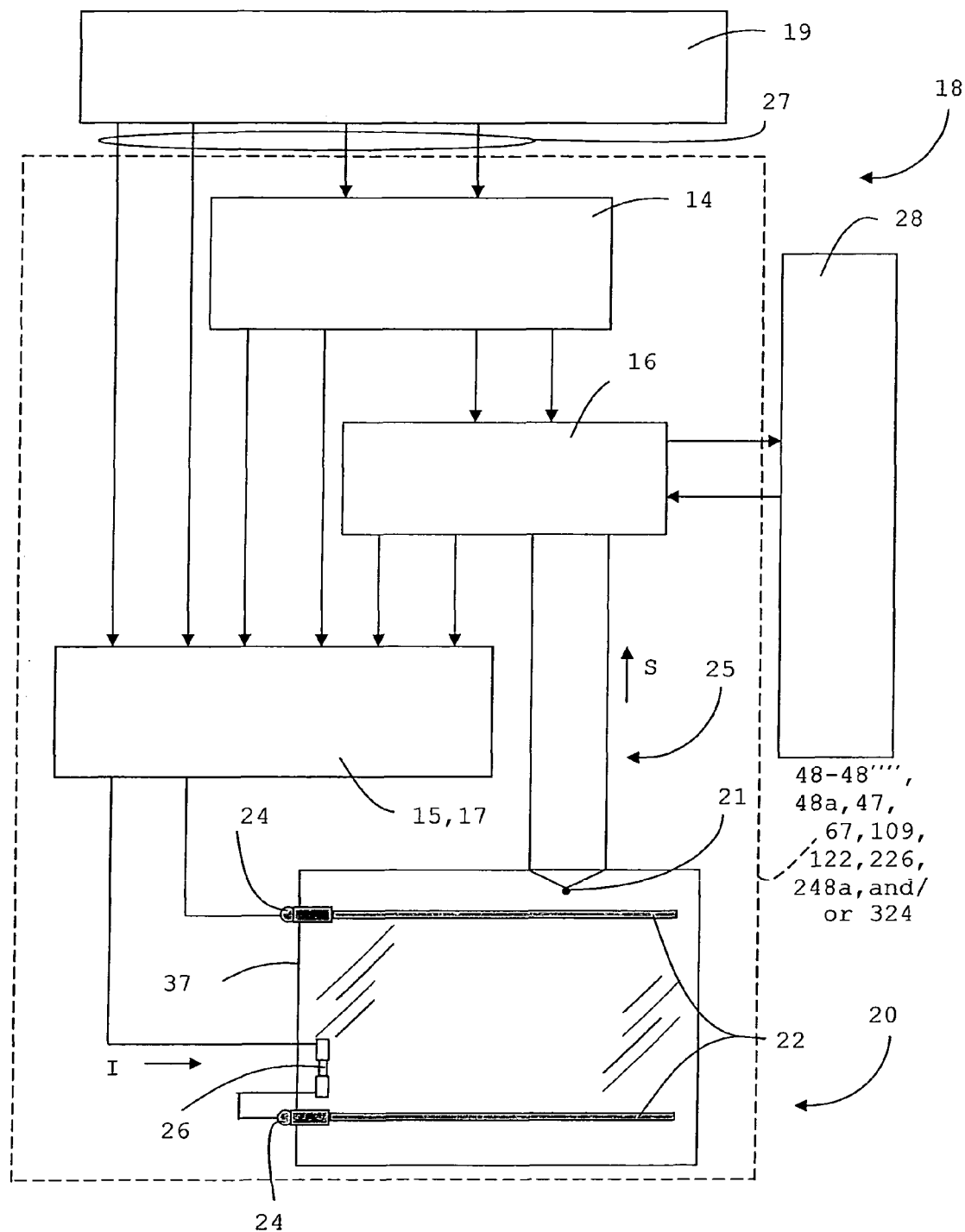
FIG. 1a is a schematic of an overview of an integrated connection circuit in accordance with the present invention.

The present invention employs an integrated connection circuit 18, as shown in FIG. 1a, where electrical current (I) passes through a coating that is disposed on a sheet of a dielectric material, for example, an electrically conductive heated glass panel 20, to generate heat that can be used for warming, cooking, moisture control, and the like. The panel 20 may be realized within the present invention as a laminated panel 40 (see, for example, FIG. 9a), an insulated glass panel 30 (see, for example, FIG. 8a), or a combination thereof. The present invention has also been found to apply to sheets that are dielectric substrate materials other than glass, for example, ceramic and glass-ceramic materials.

Figure 2:
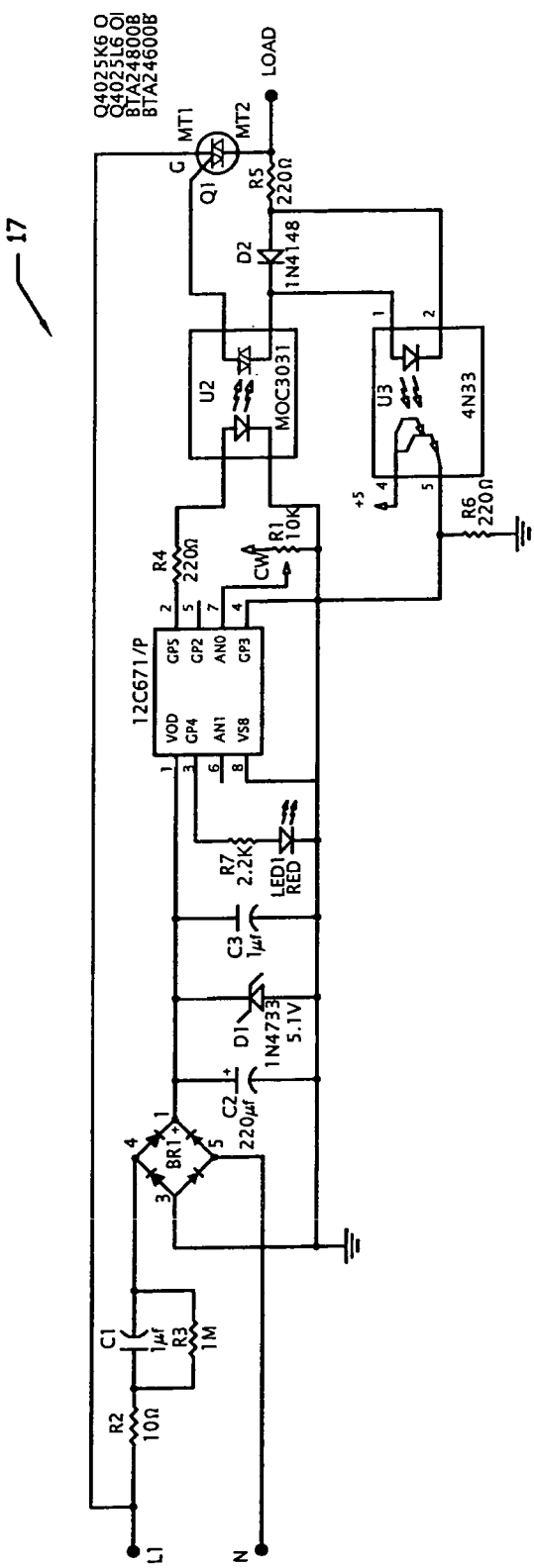
FIG. 2 is a schematic of a current-switch circuit that employs triacs in accordance with the present invention.

In order to control the electrical current (I) flowing through the electrically conductive heated glass panel 20, an electronic solid-state controller 16 (for example, a programmable application-specific integrated circuit (ASIC) chip, see 12C671/P of FIG. 2), would monitor inputs like a signal (S) from a condition-sensing means, for example, a condition sensor 21. As used herein, the electronic solid-state controller 16 is defined to be an electronic device comprising a microprocessor.

Examples of conditions that could be sensed by the condition sensor 21 include, but are not limited to, temperature, moisture, voltage, and current. Also, the signal (S) may be obtained from voltages taken across the bus bars 22. If those voltage signals (S) are taken rapidly by way of the controller 16 the voltages can be converted into an indication of the temperature of the panel 20.

Another way the present invention may obtain a signal (S) is through the placement of a thermostatic switch (not shown) on a major surface 33 (see, for example, FIG. 1b) of the panel 20, wherein if the temperature of the surface 33 reaches a first setpoint, the thermostatic switch is electrically conductive and if the surface temperature reaches a second setpoint the thermostatic switch is electrically nonconductive.

Upon receiving the signal (S), the solid-state controller 16 might respond to the signal (S) by commanding various operations, like controlling a current-switch circuit 15, for example, a triac circuit 17 shown in FIG. 2, to be operated in a zero-axis crossing manner. Consequently, the solid-state controller 16 would precisely control heating of the electrically conductive heated glass panel 20.

It is a discovery of the instant invention that the controller 16, the triac circuit 17, and associated conductors/wiring 27 and circuitry may be disposed within, for example, a frame 48-48"", 109, 122, 324, a support member 226, a cover 248a, a chase 48a, and/or a channel 47, 67. Further, by placing the triac circuit 17 within the items 48-48"", 47, 67, 109, 122, 226, 248a, and/or 324, the heat generated by the triac circuit 17 can be dissipated to a space outside of the panel assembly 20 via thermal contact areas 48b-48b''' (see various figures that depict these areas 48b-48b'''). The thermal contact areas comprise thermally conductive material, for example, a thermally conductive metal.

By operating the triac circuit 17 in the zero-axis crossing manner, problems such as harmonic distortion and electromagnetic interference (EMI) are overcome. Use of the zero-axis crossing manner also minimizes capacitive coupling and leakage current problems associated with using dielectric material with electrical currents (I).

In the present invention, the current-switch circuit 15, under control of the solid-state controller 16, would provide optical isolation (as shown in FIG. 2 by components U2 and U3) in the current-switch output control lines. In turn, this minimizes electrical interference to, for example, a control circuit 25, the electrically conductive heated glass panel 20, and external sensors and controls 28.

In addition, the solid-state controller 16 allows the present invention to usefully integrate disparate parts of the electrically conductive heated glass panel 20 in a more comprehensive manner than RC networks and other control methods can provide. This allows the solid-state controller 16 to more effectively control, for example, appliances, heating elements, vehicles, or building functions by way of the external sensors and controls 28, while employing wired or wireless devices. System variables are easily changed by a use of the solid-state controller 16.

Further, the solid-state controller 16 would provide impedance matching for the current-switch circuit 15, which would result in more complete system safety by monitoring voltage and current levels that are too high and too low. This would protect users and system components, for example, by shutting down associated equipment. Other forms of electrically conductive heated glass panel controls may not be able to provide this capability.

Additionally, regarding glass breakage safety, the solid-state controller 16 is capable of monitoring the current (I) passing through the coating 44 on the panel 40. If the current (I) were to cease in the coating 44, then the panel 40 may have broken. Also a strip switch 26 may be applied that would be sealed within the laminated glass panel 40, as further illustrated in FIG. 9a. If the uncoated glass sheet 32 were to break then the current (I) through the strip switch 26 would cease, wherein the solid-state controller 16 would sense a change in the current (I), would cut off power to the damaged laminated glass panel 40, and would signal users of the integrated control circuit 18 of such an event, so as to keep the users from being exposed to an electrical shock and physical cuts due to broken glass.

By operating the current-switch circuit 15 in the zero-axis crossing manner, the solid-state controller 16 does not require controlling capacitors. This reduces cost, weight, and number of system components, which consequently reduces the necessary space to mount them. In addition, the solid-state controller 16 provides electrical isolation for system components that other control circuits cannot provide and the solid-state controller 16 provides power source conditioning, which better manages electrical component requirements.

As a result, maintenance replacement inventories are simplified, field adjusting of system devices and set points are reduced, as well as associated costs. Since the electronic controller 16 can read internal and external system signals (S), precision control of glass temperatures can be provided, system performance can be monitored, and early warning of system problems can be detected that other electrically conductive heated glass panel control methods cannot achieve.

Figure 1B:
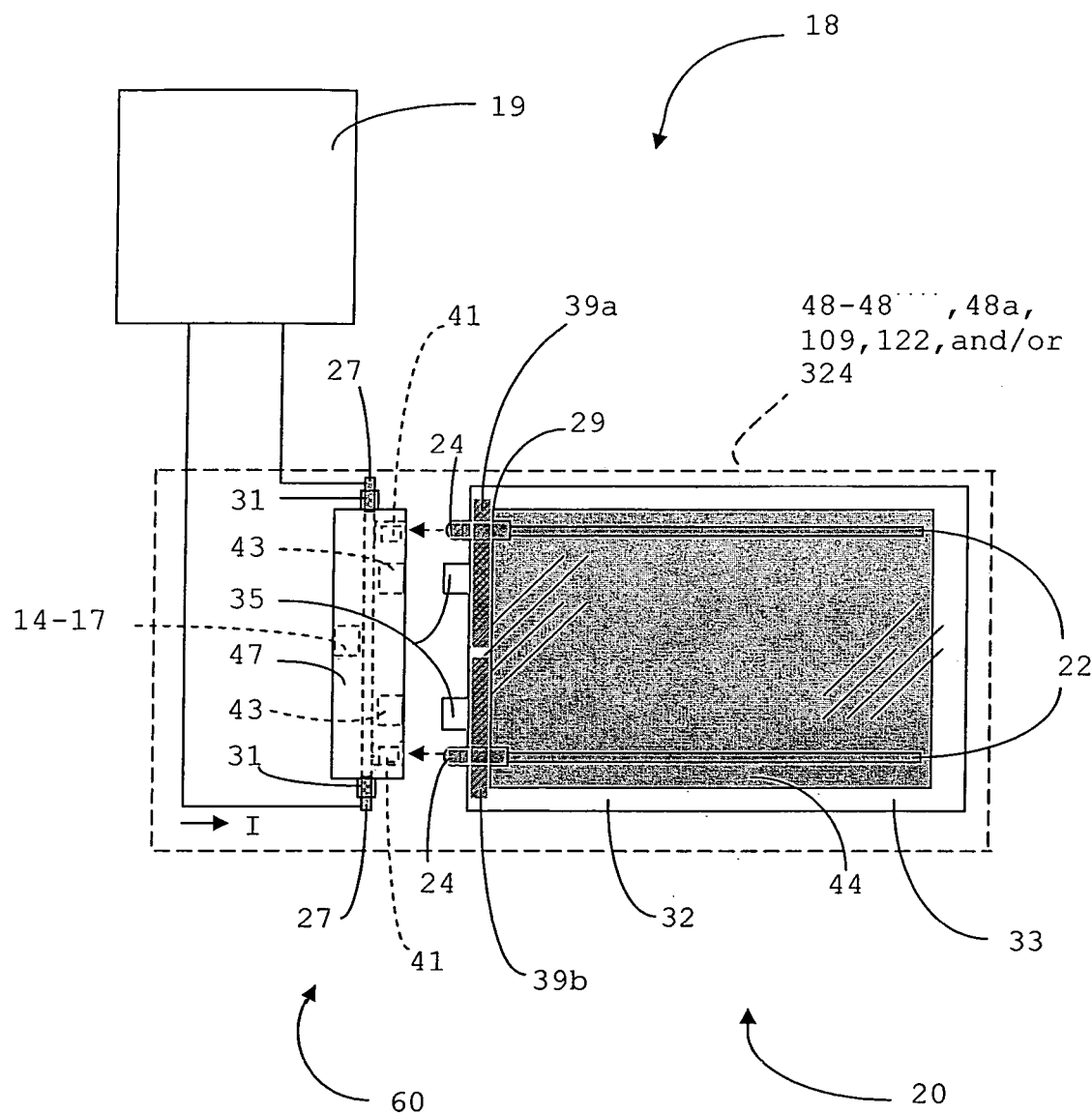
FIG. 1b is a schematic of an interconnection of an electrically conductive heated glass panel and a first glazing channel in accordance with the present invention.

To interconnect the electrically conductive heated glass panel 20 to the current-switch circuit 15 and to interconnect a plurality of electrically conductive heated glass panels 20, a first glazing channel 60 may be employed, as shown in FIG. 1*b*. Panel setting blocks 35, that are disposed on the electrically conductive heated glass panels 20, mate with base setting indentations 43 to provide mechanical mounting for the electrically conductive heated glass panels 20. The first glazing channel 60 may or may not be positioned within the items 48-48'''', 109, 122, and/or 324.

Further, portions of metal foil 39*a*, 39*b* are disposed within the electrically conductive heated glass panels 20, from a glass panel peripheral edge 37, up to a sight line 29, and onto metallic tabs 24. The metallic tabs 24 and foil 39 electrically connect to the first glazing channel 60 by being clasped by connection clips 41, which electrically connect to channel conductors/wires 27. Insulating sleeves 31 and the wires 27 provide means to allow the electrically conductive heated glass panels 20 to be connected to additional electrically conductive heated glass panels 20. Note that the use of metal foil 39 as described here may be applied to other glazing channels.

Consequently, the current-switch circuit 15 that controls the electrical current (I) may allow the electrical current (I) to be conducted through the glazing channel 60, by way of the channel conductors 27 and the connection clips 41. Since the connection clips 41 clasp the metallic tabs 24, the electrical current (I) enters the electrically conductive heated glass panels 20 and passes through bus bars 22 and coating 44, which is disposed on a coated glass sheet 34. As a result, heat is generated within the electrically conductive heated glass panels 20 for heating objects and removing moisture.

Figure 1C:
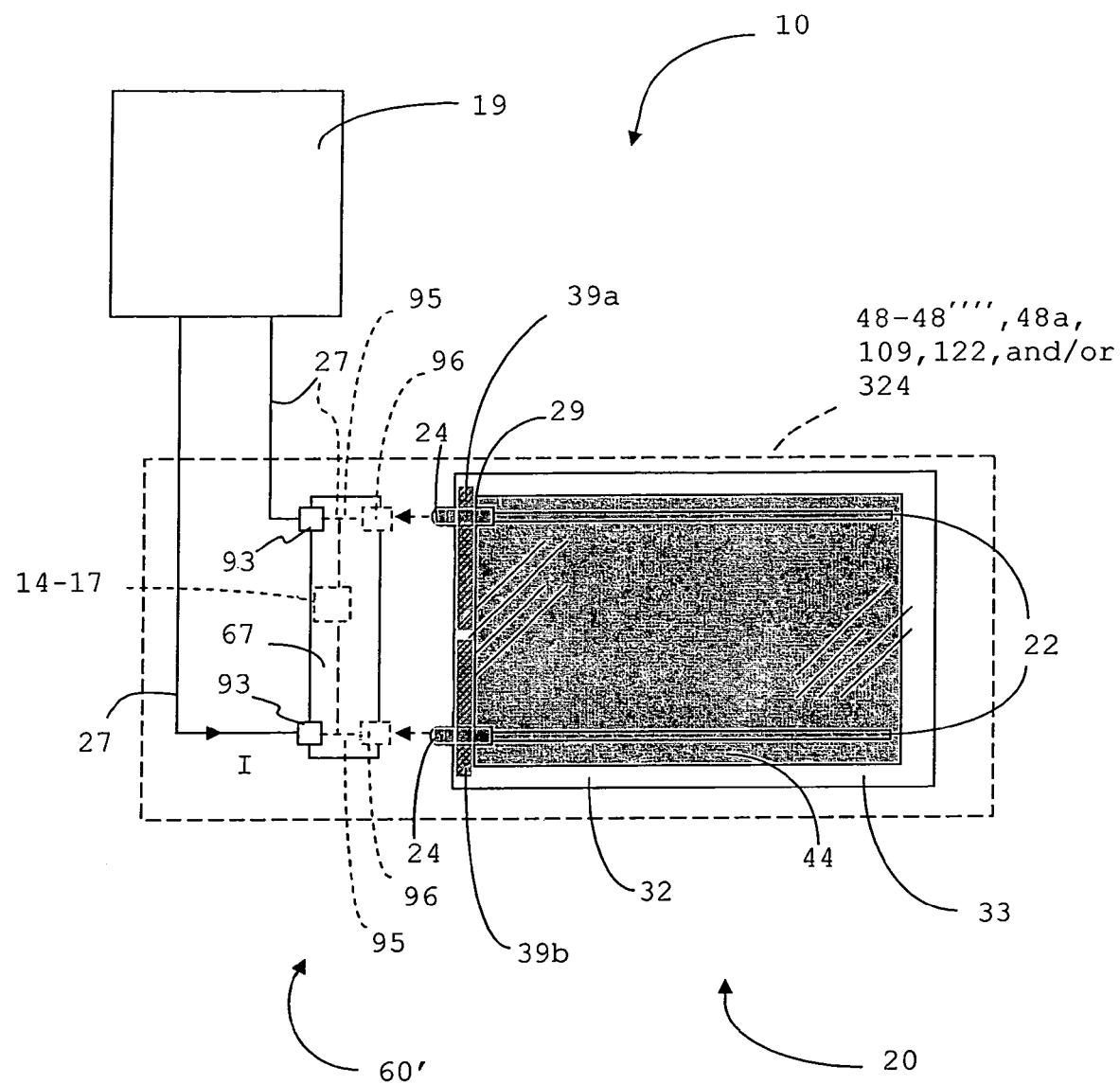
FIG. 1c is a schematic of an interconnection of an electrically conductive heated glass panel and a second glazing channel in accordance with the present invention.
Figure 7:
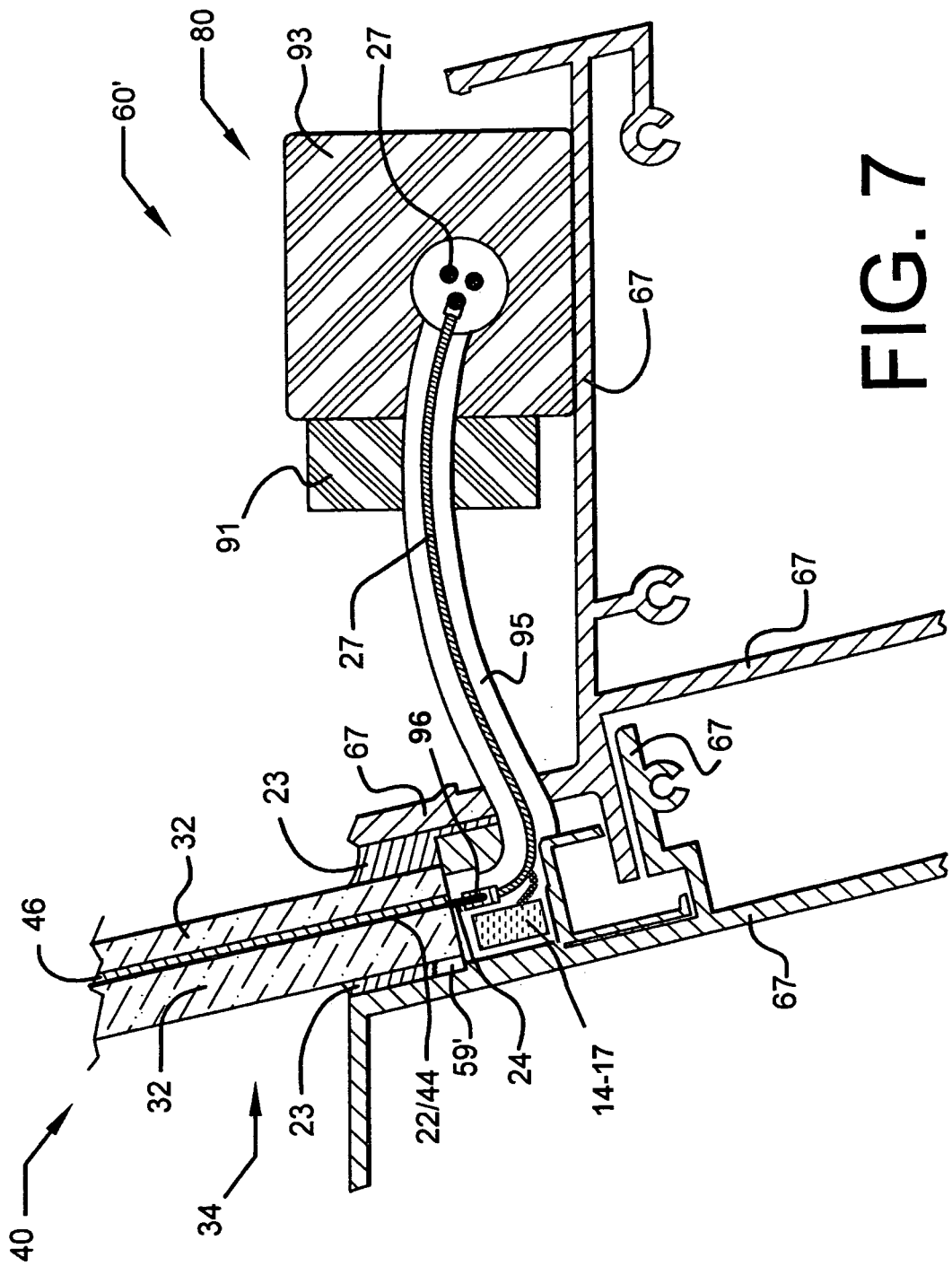
FIG. 7 is a cross sectional view of an installation of an electrically conductive heated glass panel within the second glazing channel in accordance with the present invention.

An alternative to the first glazing channel 60 of FIG. 1*b* is a second glazing channel 60', illustrated in FIG. 1*c* and with more detail in FIG. 7. Although illustrated as a laminated panel 40 in FIG. 7, the panel 20 could be an insulated glass panel 30 or a combination of both types of panels. The electrically conductive heated glass panel 20 is mechanically mounted to a channel frame 67, which may be disposed within the frames 48-48'''', 109, 122, chase 48*a*, and/or 324, and electrically connected to the metallic tabs 24 by way of spade connection 96 that is attached to an end of the channel conductor 27. The channel conductor 27 is in turn routed through the channel frame 67 by way of a channel conduit 95 and conductor block 93, and then electrically and mechanically connected to the interconnecting channel conductor 27 by conventional means. Glazing seal 23 is disposed in a second glazing channel cavity 59' and in voids throughout the channel frame 67 to seal out moisture and dirt, and to protect the parts of the second glazing channel 60' from damage.

Figure 1D:
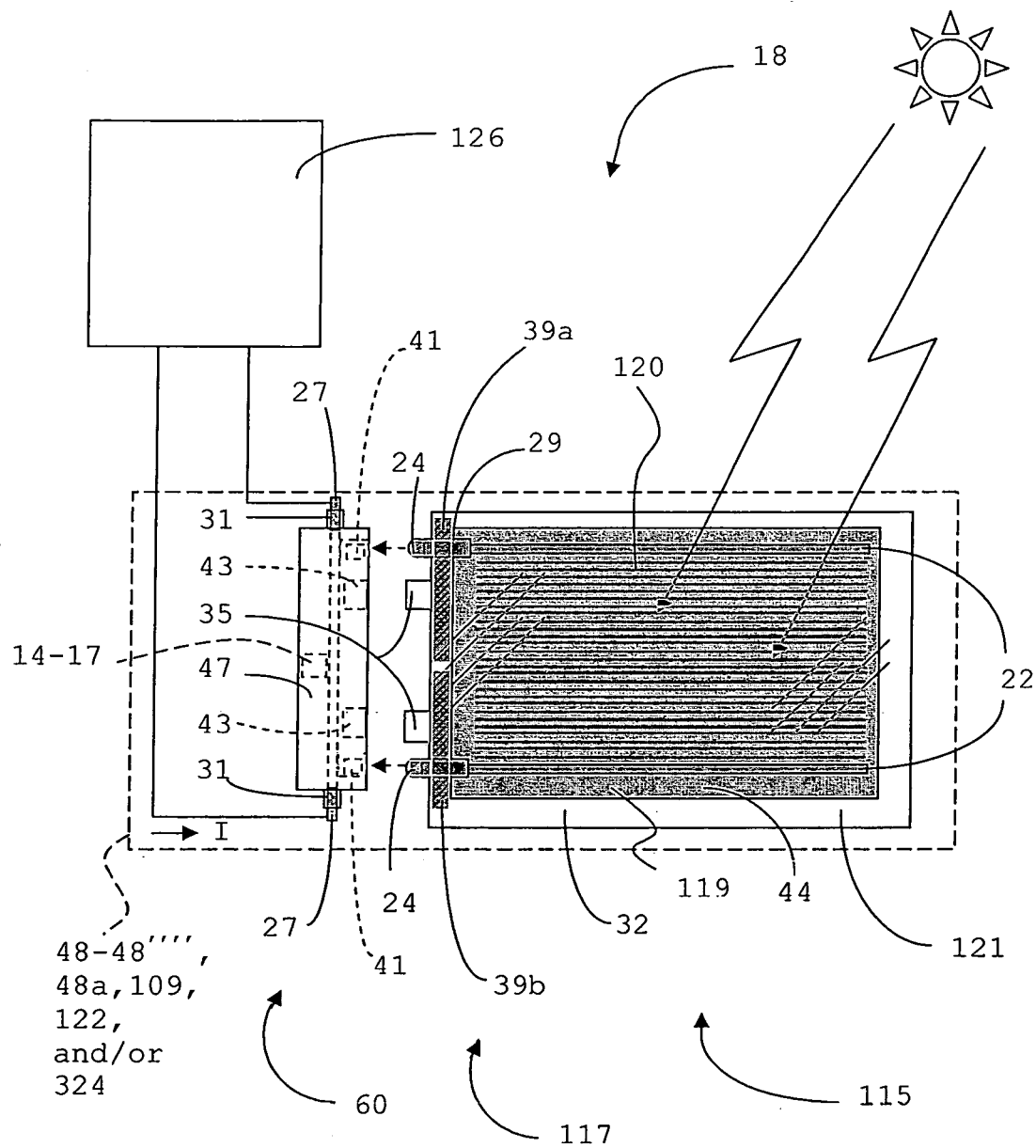
FIG. 1d is a schematic of an interconnection of a solar glass panel and the first glazing channel in accordance with the present invention.
Figure 1E:
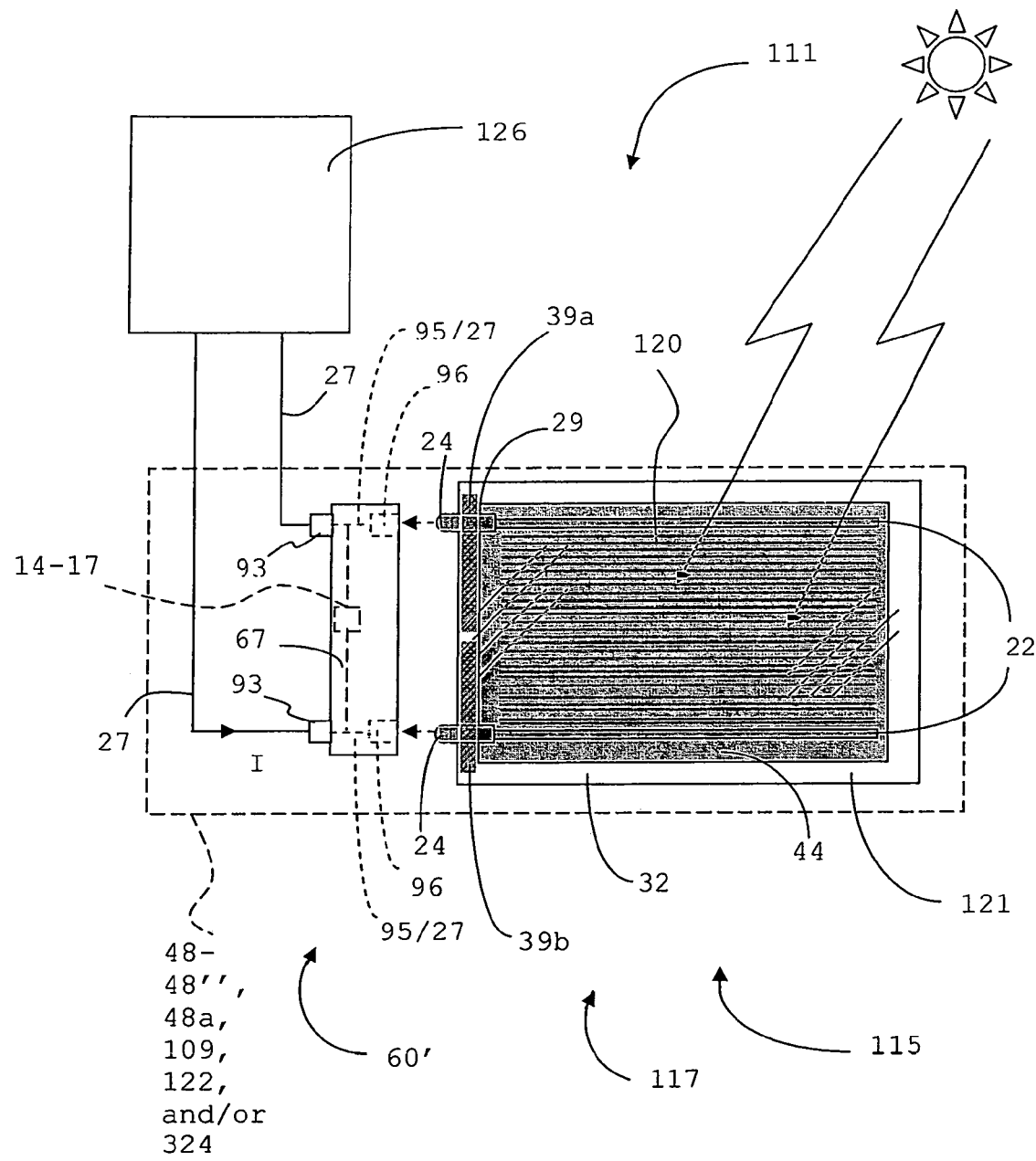
FIG. 1e is a schematic of an interconnection of an solar glass panel and the second glazing channel in accordance with the present invention.

Consequently, the current-switch circuit 15 that controls the electrical current (I) may allow the electrical current (I) to be conducted through the second glazing channel 60'. As a result, heat is generated within the electrically conductive heated glass panels 20 for heating objects and removing moisture. As illustrated in FIGS. 1*d-e*, both glazing channels 60, 60' would be applicable for photovoltaic applications, such as those disclosed in U.S. Utility patent application Ser. No. 10/403,924 that was filed Mar. 26, 2003 which is incorporated herein by reference.

It may be noted that conventional type K thermocouples or possibly a thin film thermocouple like that disclosed in U.S. Pat. No. 6,072,165 to Feldman (which is incorporated herein in its entirety) may be used for temperature determination. An advantage of the present invention is that programming the solid-state controller 16 with the coefficient of resistance of the electrically conductive heated glass panel 20 and momentarily sampling voltages across sets of bus bars 22, the solid-state controller 16 could compare those voltages to redetermined thresholds (a.k.a., setpoints) so as to determine the temperature of the panel 20. Thus, the temperature of the panel 20 may be controlled without the use of any thermocouple.

Figure 17:
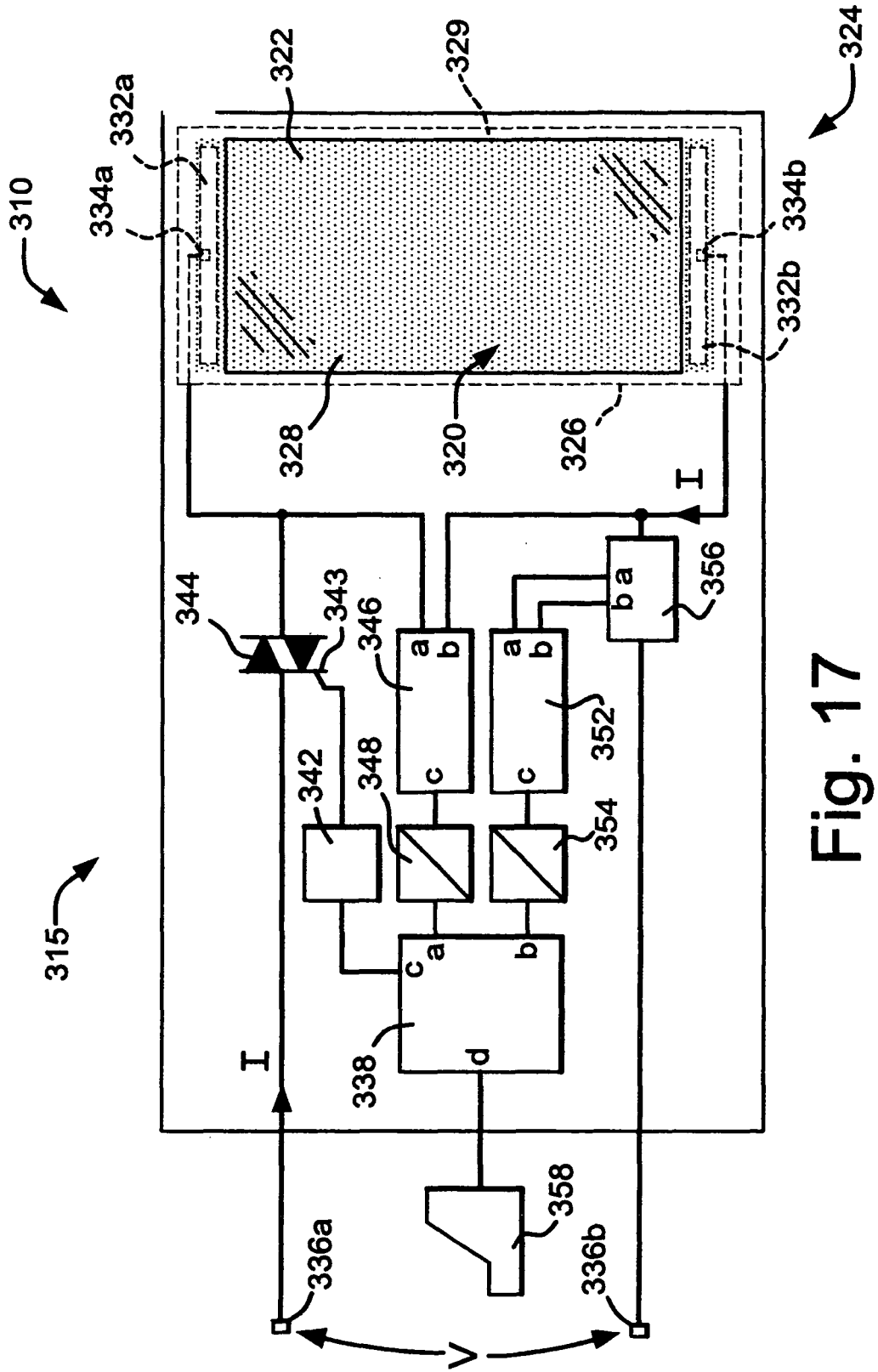
FIG. 17 is an electrical schematic of a control circuit for a heated architectural panel in accordance with the present invention.

FIG. 17 illustrates an indirect temperature measurement system 310, which is disposed in panel frame 324, while utilizing a temperature control circuit 315 for a heated architectural panel 322. This system 310 is detailed in U.S. Provisional Application No. 60/654,304 that was filed Feb. 18, 2005, which is incorporated by reference herein.

In general, a voltage V across power terminals 336*a, b* potentially causes current I to flow through the connections 334*a, b*, the bus bars 332*a, b*, and through the coating 328, which is disposed on a major surface 329 of the heated panel 322 that has a peripheral edge 326. This results in heating the panel 322, which is disposed in an opening 320.

A temperature control microprocessor 338 may be connected to and set up by means common in the art, like interface device 358, which may or may not be disposed in the panel frame 324. The microprocessor 338 controls the triac 344 by way of a gate drive 342 via a gate input 343 of the triac 344. A first signal conditioner 346 provides an analog signal of the voltage V to a first analog to digital converter 348, which in turn provides a digital representation of the voltage V to the microprocessor 338.

A current sensing device 356 (e.g., based on the Hall effect) indirectly senses the current 1, which is provided to a second signal conditioner 352. The second signal conditioner 352, in turn, provides an analog signal of the current I to a second analog to digital converter 354, which passes along a digital form of the current I to the microcontroller 338. While utilizing an algorithm that is applied to the digital current and the digital voltage, the microcomputer 338 determines the temperature of the panel 322.

By using the controller 16 (see, for example, FIG. 1*a*) along with the type K thermocouple, the film thermocouple, or the indirect voltage/current methods of temperature sensing (see, for example, FIG. 17), a panel 20, for example, one installed in a sport stadium box, would not overheat, break, or cause damage, as other glass assemblies would.

The solid-state controller 16, the microcomputer 338, the condition sensors 21, the indirect measurement items 342-344, 346, 348, 352, 354, and 356 (i.e., temperature control circuit 315), the current-switch circuit 15, the metallic tabs 24, direct current power supplies 14 that are illustrated in FIG. 1*a* and FIG. 17, along with conventional wiring 27, 90 may be disposed in the panel frame 324. In addition, insulating boots, terminal strips, direct current to alternating current inverter circuits, ground fault circuit interrupter (GFCI) circuit breakers, on-off alternating power source controls, connections to external sensors and controls 28, NEC electrical wiring termination boxes and connecting wiring, the channel conduit 95, base setting block 47, channel frame 67, and the conductor blocks 93, may all be placed in one or more of the panel frames/chases 48-48'''', 48a, 109, 122, or in conventional NEC control panels. In the present invention, the items 47 and 67 are generally considered to be support members.

It should be appreciated that the panels 20 of the present invention may require GFCI circuit breakers to assure the integrity of the integrated control circuit 18 and to assure the reliability of the integrated control circuit's components. Also, by controlling where the controller 16 (and other controllers, like the microprocessor 338 of FIG. 17) is disposed, the electrical wiring lead length can be standardized to assure proper heating by the panels 20.

The panel setting block 47 and the channel frame 67 may themselves have any or all of the above-stated controls, circuitry, and wiring disposed in them as the various figures illustrate. This will result in advantageously placing the parts out of sight and minimizes field set up of the controls and wiring 27, 90, while conserving space and improving electrical characteristics of the panels 20.

It is a discovery of the present invention that when the triac circuit 17 is turned on by, for example, the electronic controller 16, the triac circuit 17 drops approximately 1 volt for every amp of current, which results in approximately 1 watt of power. Since the triac circuit 17 is rated for a maximum of 8 amps, this results in approximately 8 watts of power. When the circuit 17 is utilized with an extrusion (corresponding to thermal contact areas 48b-b''') of approximately 2 inches by 60 inches (i.e., 0.833 sq. ft.), this results in 9.6 watts per square foot.

For a heated architectural panel 20, it is known that 10 watts per square foot yields 70 degrees F. under winter conditions. Hence, the power density of the controller 16, when the architectural metal is used as a heat sink 48b-b''', is similar to the power density of the heated glass panel 20. Therefore, the heat sink 48b-b''' yields a comparable surface temperature.

Figure 3:
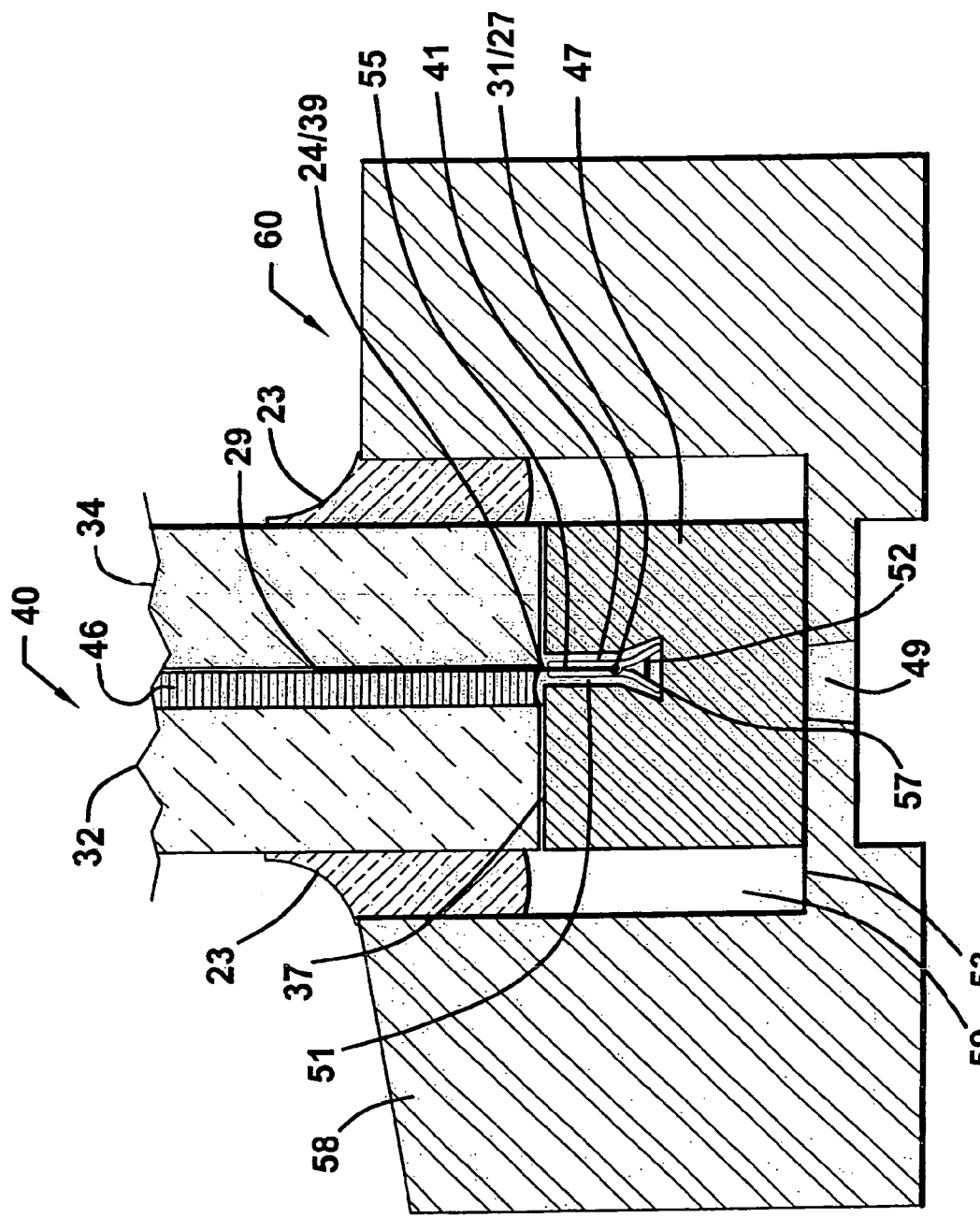
FIG. 3 is a cross sectional view of an installation of an electrically conductive heated glass panel and a base setting block, within the first glazing channel in accordance with the present invention.

Referring to FIG. 3, there is shown the first glazing channel 60, which is an assembly of three subassemblies in accordance with an aspect of the present invention: (1) the laminated glass panel 40 (the insulated glass panel 30 or combination laminated and/or IG panel, along with a glass solar panel, may be employed as well), (2) the base setting block 47, and (3) a glazing channel base 58. In FIG. 3, the laminated glass panel 40 is shown having the metallic tab 24 and the metal foil 39 disposed within the interlayer 46, where the metal foil 39 is disposed from the sight line 29 to the glass panel peripheral edge 37 and onto the exterior portions of the metallic tabs 24, so as to keep the metal foil 39 out of the sight of users, where the metal foil 39 is being utilized to reduce EMI, static, and other electrical interference.

As shown in FIG. 1b and FIG. 1d (a glass solar application), a portion of the metal foil 39a that is disposed on a particular metallic tab 24 may not be in direct electrical contact with another portion of metal foil 39b, within the same laminated glass panel 40. This separation of the portions of the metal foil 39a, 39b may be required in order to allow the electrical current (I) to be conducted through one metallic tab 24 and its corresponding bus bar 22, the conductive coating 44, another bus bar 22 and its corresponding metallic tab 24.

External to the laminated glass panel 40, both the metallic tab 24 and the metal foil 39 are shown extending from the glass panel peripheral edge 37. The deposition of the metal foil 39 and the metallic tab 24, as described, causes the two to be in electrical contact with each other, thus providing a measure of redundancy. In addition, FIG. 3 shows the metal foil 39 and the metallic tab 24 being mechanically clasped by opposing inside clasping surfaces 55 of a connection clip 41, the clasping by the clasping surfaces 55 being a result of a spring 52 urging the connection clip 41 about a pivot 57.

The extension of the spring 52 is a result of a movement of the connection clip 41 within the base setting block 47, wherein the base setting block 47 is formed so as to define at least a widened portion of a block cavity 51. As a result of the aforementioned movement, the laminated glass panel assembly 40 (which could be a glass solar panel 115 of FIG. 1d-e or assembly 40' of FIG. 9c) and the base setting block 47 abut to form a panel/block assembly 40/60 or 115/60. Subsequently, the abutment of the laminated glass panel 40 and the base setting block 47 are further abutted to a glazing channel surface 53 that is positioned to define at least a portion of a first glazing channel cavity 59 within a glazing channel base 58.

Although not limited in this regard, the glass solar panels 115 may, for example, supply electricity to an electrical load or charge a battery.

To further assure that the wiring 27, 90 of the laminated glass panels 40 is hidden from the view of the user and to allow moisture to drain out and away from the laminated glass panels 40, wiring/drain holes 49 may be provided in the glazing channel base 58, preferably at the time of manufacturing, so as to minimize the need to drill holes in the laminated glass panels 40 during installation in a structure or the like. In addition, the controls 14-17 could be placed preferably in the frames/channels/chases/blocks/channel frames/support members 48-48'''', 48a, 47, 67, 109, 122, 226, 248a, and/or 324 at time of manufacturing, in order to provide a better panel assembly 20.

Unbonded areas (UBAs) may form on the aforementioned assembly, which can result in: (a) moisture entering, (b) glass chipping, (c) glass swelling, and (d) electrical connections being adversely affected. In the present invention, a glazing seal 23 is preferably disposed in assembly voids to minimize the negative effects of UBA.

Figure 4A:
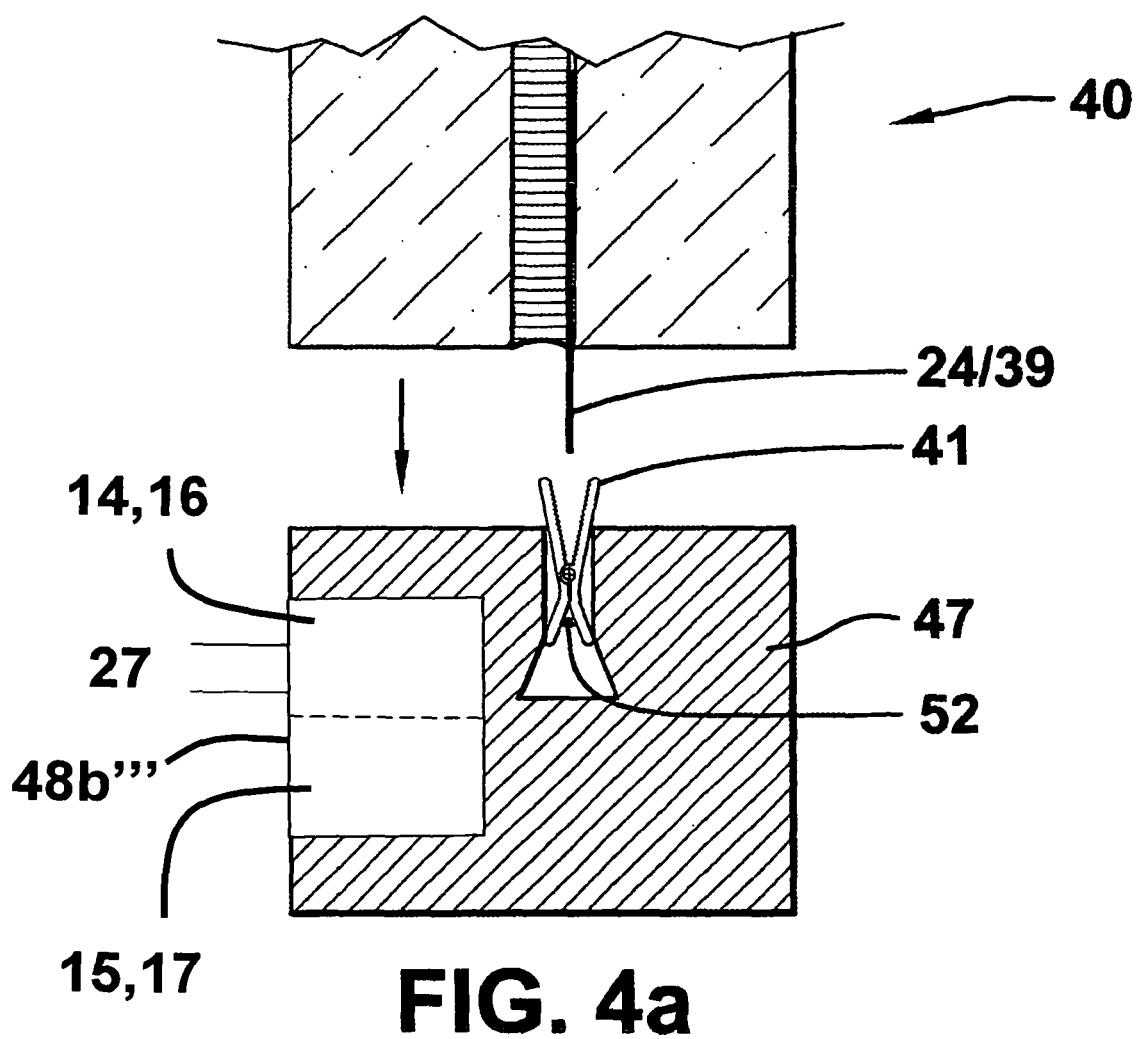
FIG. 4a is a cross sectional view of an electrically conductive heated glass panel and the base setting block in a partially closed connection position in accordance with FIG. 3.
Figure 4B:
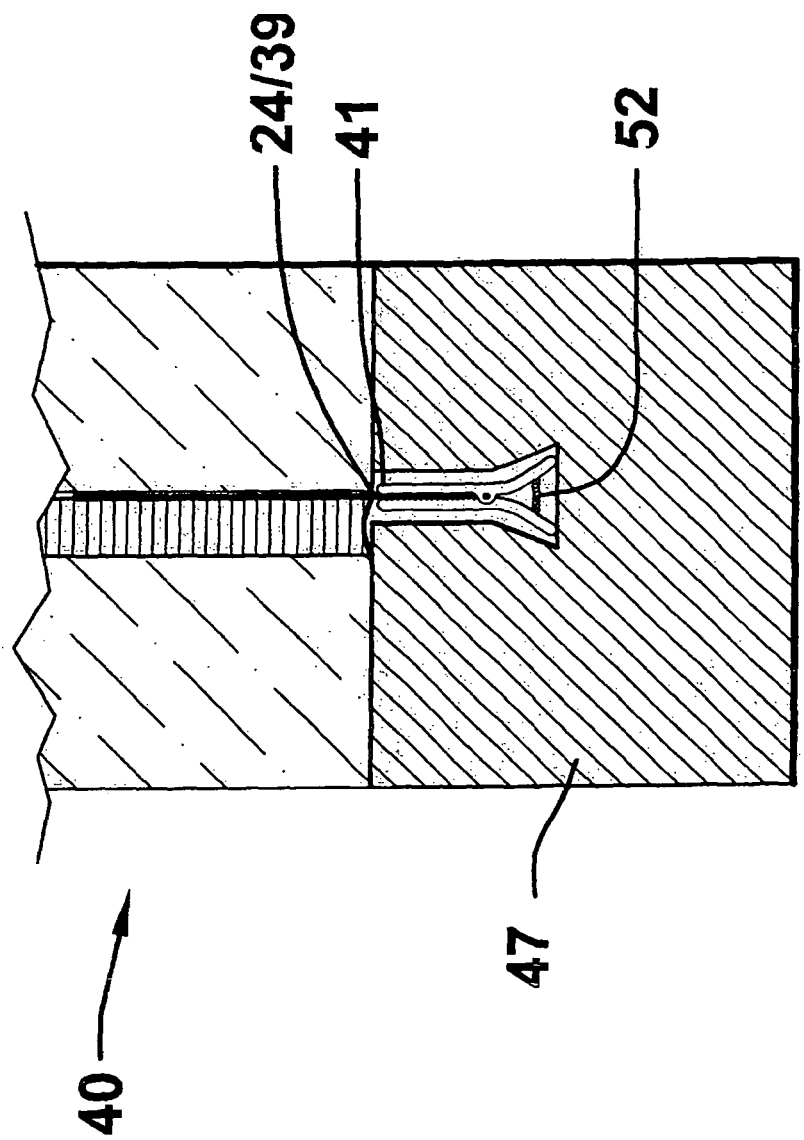
Figure 4C:
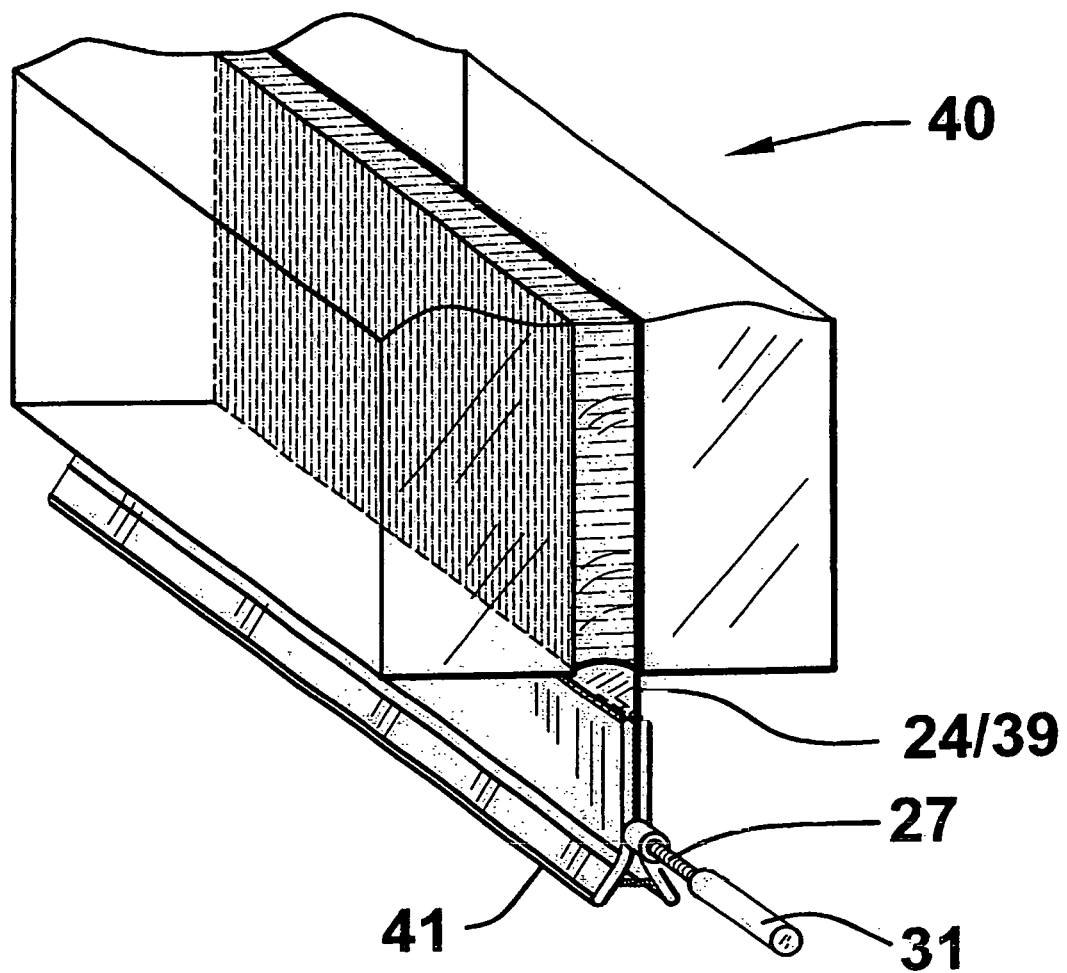

As illustrated in FIGS. 4a-4c, there is shown the laminated glass panel 40 (the insulated glass panel 30 or combination laminated and/or IG panel, along with a glass solar panels 30', 40', 115, may be employed as well) being brought into abutment and electrical connection with the base setting block 47 and the connection clip 41 in accordance with FIG. 3. FIG. 4a shows a cross sectional view of a partially closed connection clip 41 where the spring 52 is only partially extended. Also shown is the laminated glass panel 40 approaching the base setting block 47, wherein the attached metal foil 39 and metallic tabs 24 are about to be clasped by the partially open connection clip 41 and its partially extended spring 52.

As shown in FIG. 4a, which is a discovery of the instant invention, is that all or some of the controls 14-17 may be embedded and connected (via wiring 27 or 90) within the base setting block 47. Also shown is a thermal contact area 48b''', which is also is a discovery of the instant invention, that may be utilized to conduct heat generated by the triac/current switch 15, 17 into the environment around the panel 40, so that the heat is not wasted by being captive to only the setting block 47.

As the laminated glass panel 40 and the connection clip 41 move into full attachment, the cross sectional view of FIG. 4b shows the complete clasping of the metal foil 39 and the metallic tabs 24 by the connection clip 41 along with the full extension of the spring 52. Also shown in this view are the laminated glass panel 40 and the base setting block 47 in full abutment.

FIG. 4c is a perspective view in accordance with FIG. 4a showing further details of the laminated glass panel 40 having the metal foil 39 and metallic tab 24 fully clasped by the connection clip 41 while showing an extension of the channel connector 27 with insulating sleeve 31 attached to the connection clip 41 at the pivot 57 of the connecting clip 41. The channel connector 27 along with the insulating sleeve 31, may act to interconnect a plurality of base setting blocks 47. Consequently, a plurality of laminated glass panels 40 would be interconnected within the integrated connection circuit 18.

Figure 8A:
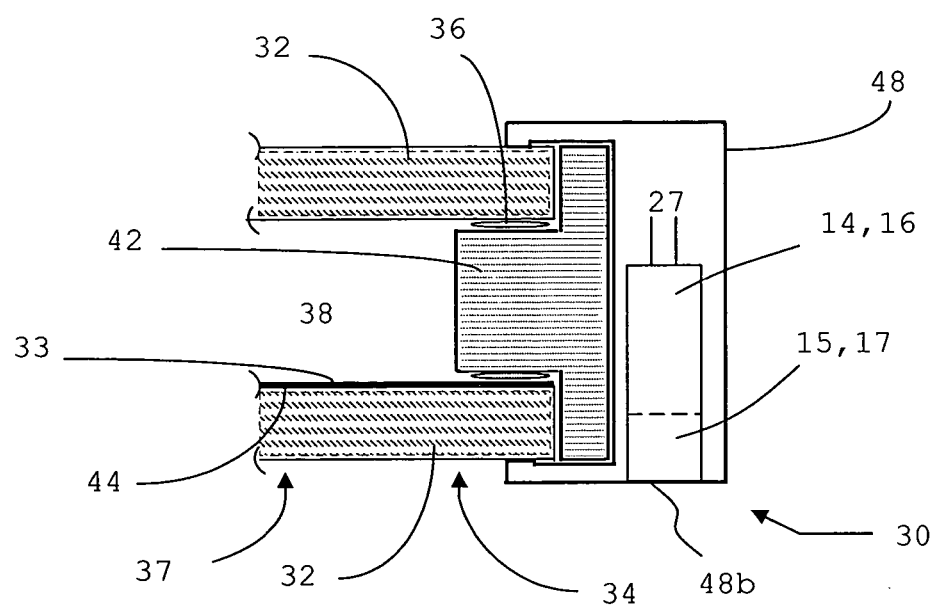
FIG. 8a is a cross sectional view at a peripheral edge of an insulated glass panel where a T-shaped spacer seal unit and a panel frame are employed in accordance with the present invention.
Figure 8B:
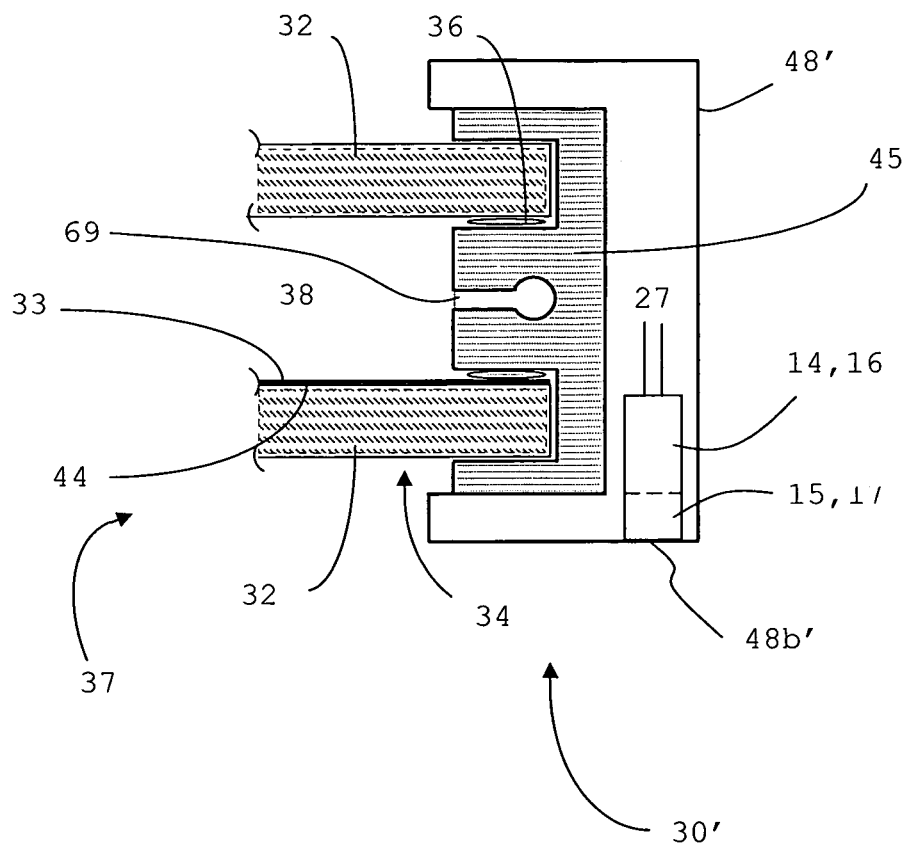
FIG. 8b is a cross sectional view at the peripheral edge of the insulated glass panel where an E-shaped spacer seal unit and a panel frame are employed in accordance with the present invention.
Figure 8C:
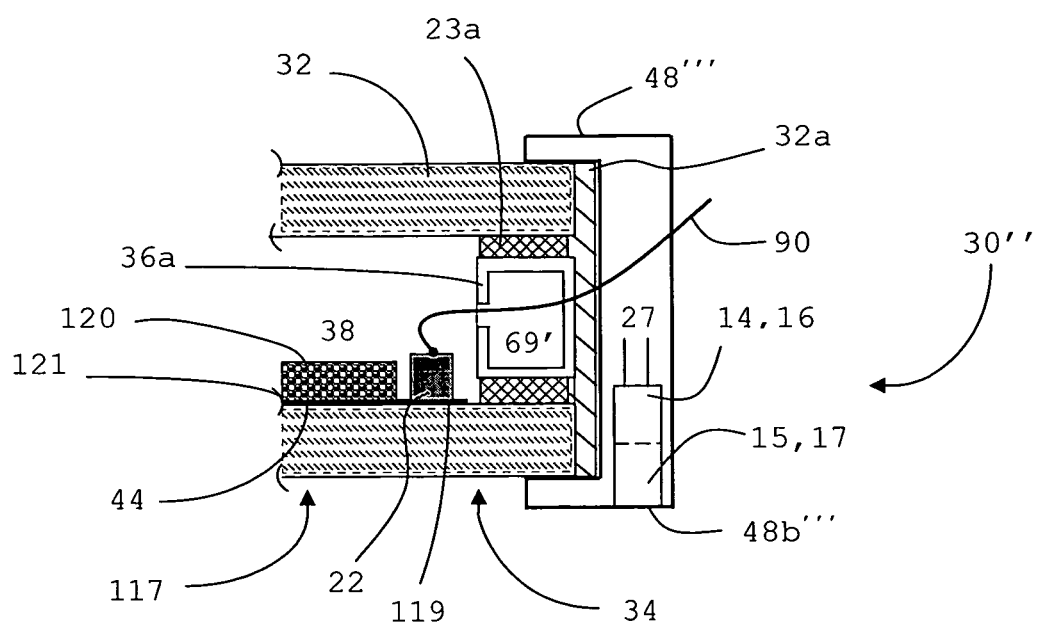
FIG. 8c is a cross sectional view at the peripheral edge of a glass solar panel where an E-shaped spacer seal unit and a panel frame are employed in accordance with the present invention.
Figure 9A:
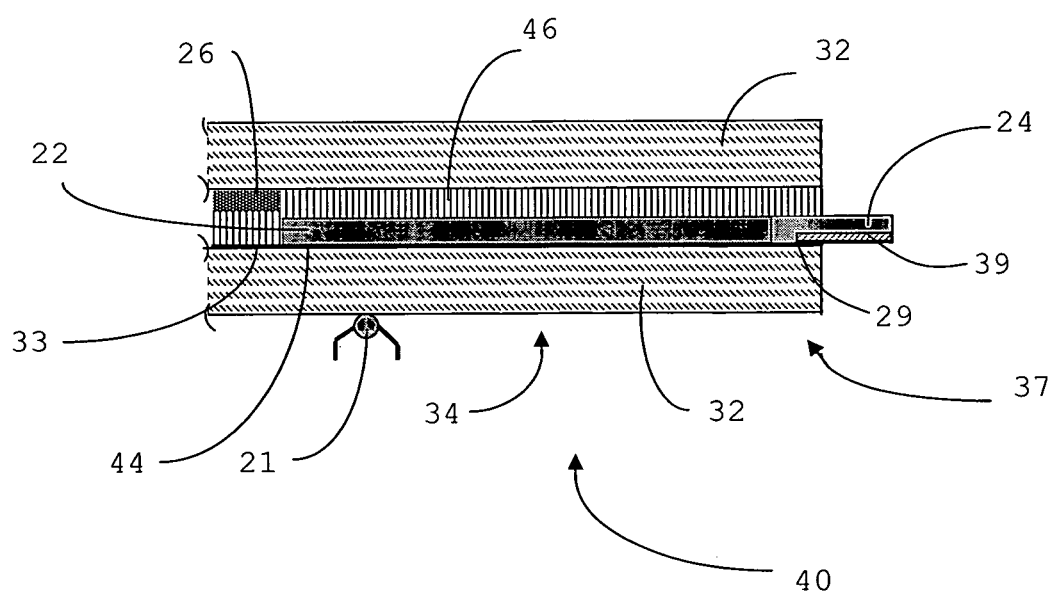
FIG. 9a is a cross sectional view at a peripheral edge of a laminated glass panel in accordance with the present invention.
Figure 9B:
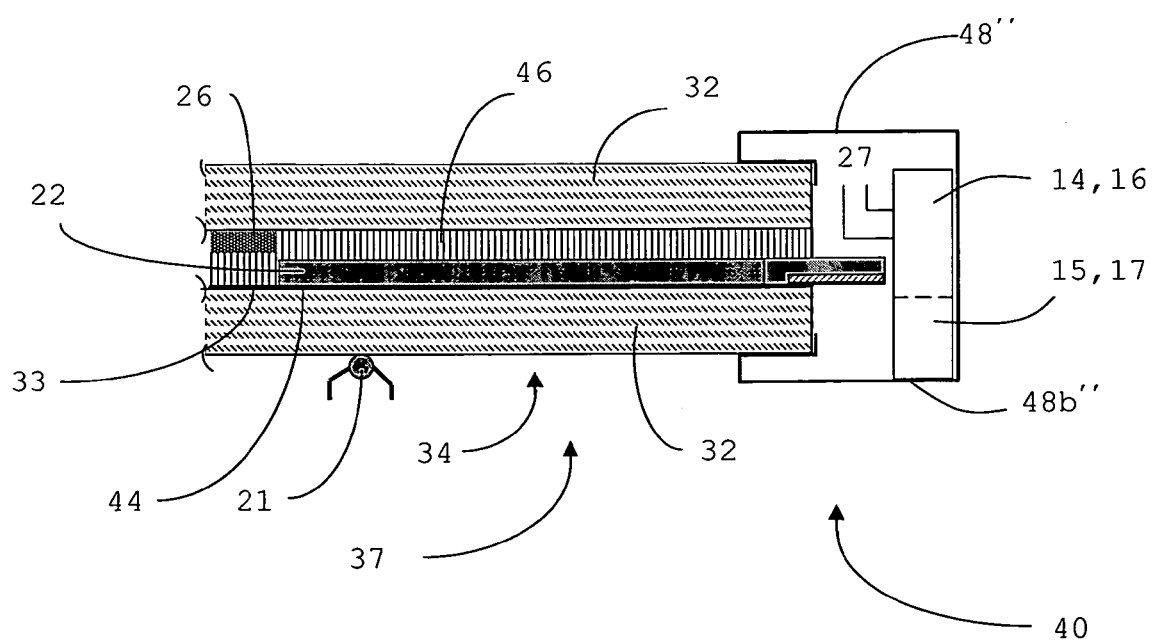
FIG. 9b is a cross sectional view of the laminated glass panel of FIG. 9a with a panel frame.

The above discussion on the interconnection of the laminated glass panel 40, by way of the metal foil 39, the metallic tabs 24, the connection clips 41, and the springs 52, in conjunction with the base setting block 47, applies as well to glass solar panels 115 (see, for example, FIGS. 1d-e) and panel assemblies 30", 40' of FIGS. 8c, 9b, respectively.

Figure 5:
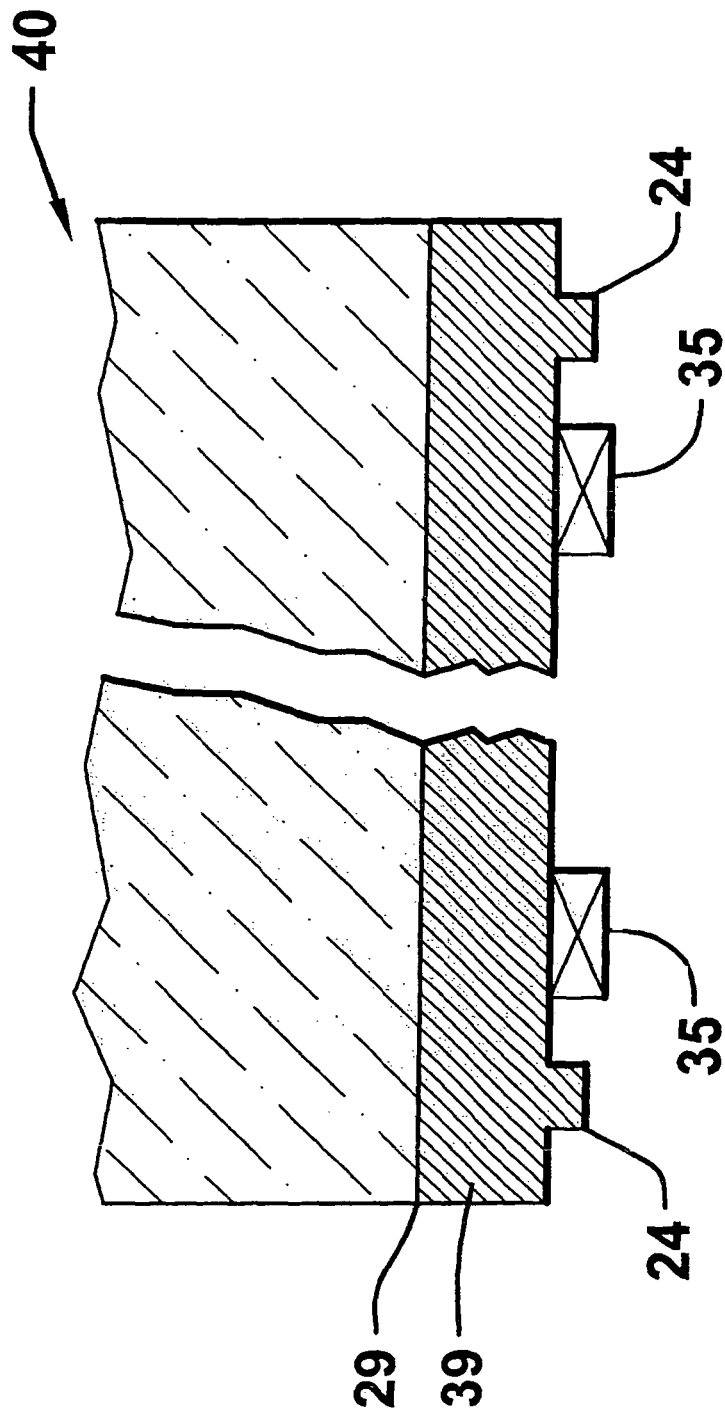
FIG. 5 is a side view of electrical and mechanical connections of an electrically conductive heated glass panel in accordance with the present invention.

Further, FIG. 5, in accordance with the present invention, shows a side view of the electrical and mechanical connection of the laminated glass panel 40 (which applies as well to the insulated glass panel 30 or a combination laminated and/or IG panel, along with the solar panels 40', 115), where the metal foil 39 covers the electrical connection for each metallic tab 24, thus providing the measure of electrical redundancy, from within the laminated glass panel 40, starting at the sight line 29, and then externally covering the extension of the metallic tabs 24.

Subsequently, the metallic tabs 24 mate with the connection clips 41, which are embedded in the base setting block 47, as shown in FIGS. 1b and 1d. A mechanical connection between the laminated glass panel 40 and the base setting block 47 is achieved by a mating of one or more panel setting blocks 35 and one or more base setting indentations 43, as shown in FIGS. 1b, 1d, and 5.

Figure 6A:
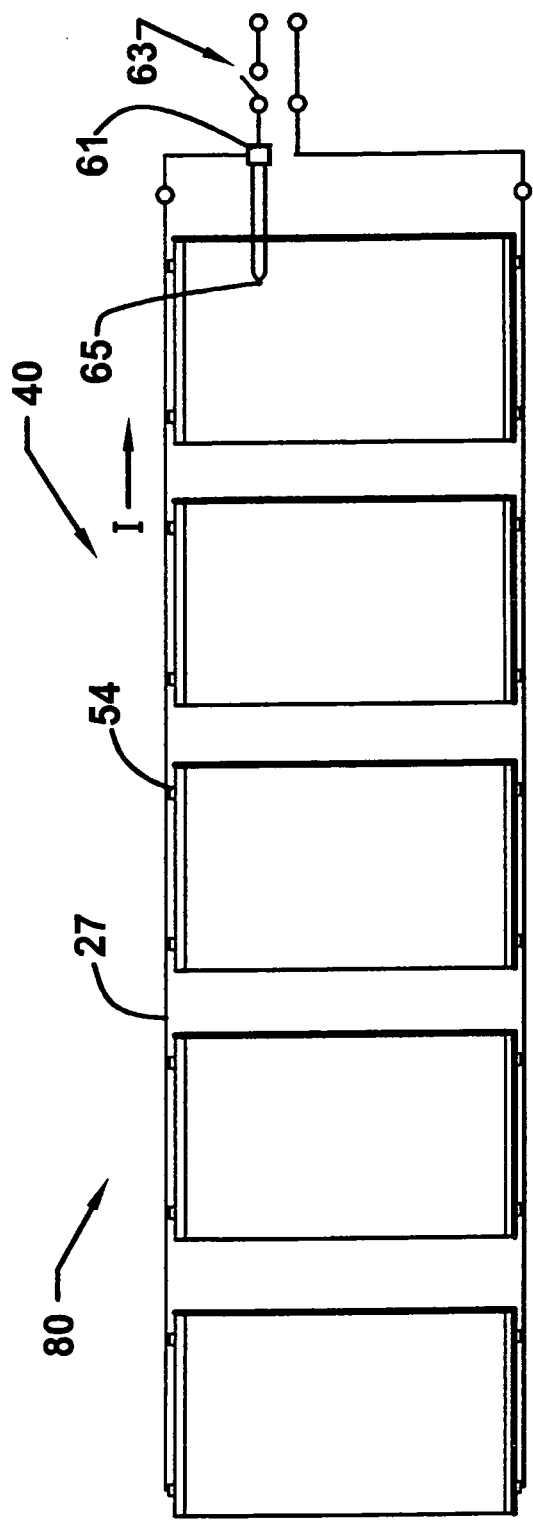
FIG. 6a is a side view of an interconnection of a first set of multiple electrically conductive heated glass panels in accordance with the present invention.
Figure 6B:
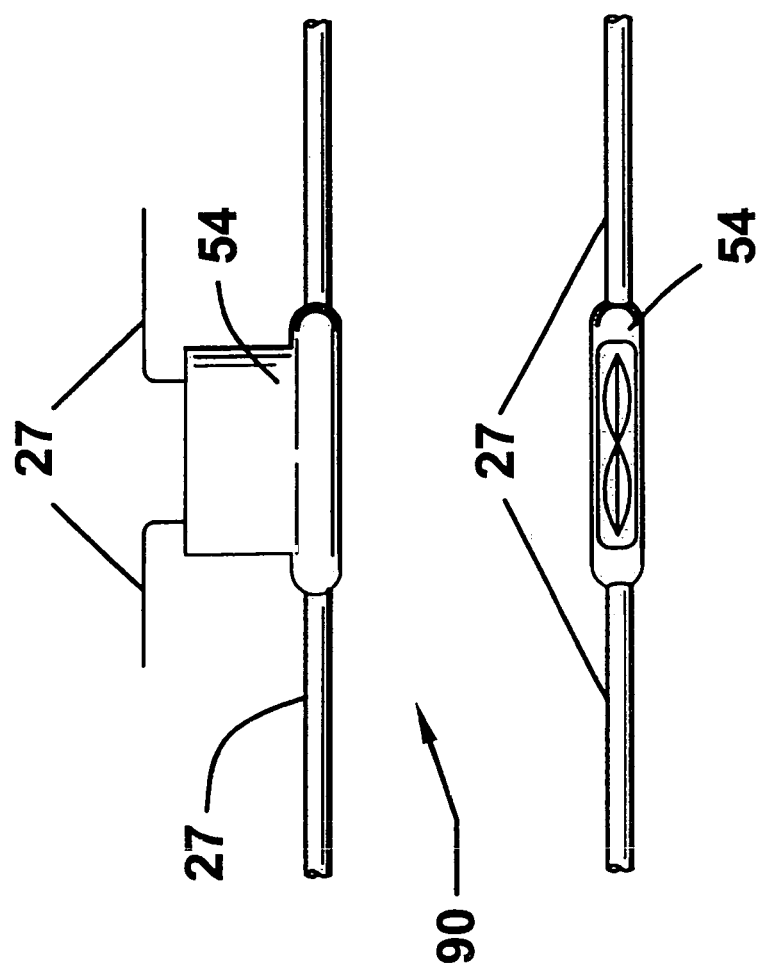
FIG. 6b is a side and bottom view of a wiring method showing a push-on connector and interconnection wires in accordance with the present invention.

In accordance with the present invention, the combination of FIGS. 6a and 6b illustrate how an interconnect 80 uses multiple panel wiring 90 to interconnect multiple laminated glass panels 40. Channel conductors 27 and push-on connectors 54, in combination with the metal foil 39 and the connection clips 41 provide ease and redundancy to accomplish the interconnection of the multiple laminated glass panels 40. These interconnection means complement the use of the channel connectors and wiring 27, and the insulating sleeves 31 for interconnecting multiple laminated glass panels 40, as discussed above.

In addition, FIG. 6a shows an application of a thermocouple 65, a circuit breaker 61, and a power switch 63, which act to monitor temperature conditions and to control power within the integrated connection circuit 18. If the temperature of the laminated glass panel 40 exceeds a setpoint temperature, as set within the circuit breaker 61, the flow of electrical current (I) will be terminated. The power switch 63 is a manual means to also terminate the flow of the electrical current (I), within the integrated connection circuit 18.

By incorporating the controls 14-17 and wiring 27 of the laminated glass panel 40 into the base setting block 47 and providing easy and redundant multiple panel wiring 90, the present invention eliminates the difficulty of making electrical connections and accidentally incorporating electrical problems into the integrated connection circuit 18. The hole drilling process into the glass sheet 32 or coated glass sheet 34, prior to lamination, as is typically done to expose the bus bars 22 for connection to the alternating current power source 19, is eliminated.

Instead, the present invention uses the metallic tabs 24 and metal foil 39, described herein that are easily incorporated into the integrated connection circuit 18. The wiring connections between parts of the integrated connection circuit 18 may have flexible boots (not shown) encasing the connections, and the glazing sealant 23 may be used to attach the flexible boots to the glass panel peripheral edge 37, so as to minimize mechanical wear and accumulation of moisture. The flexible boots, with enclosed wiring, may be dressed through conventional gaskets or sealed with sealant and then terminated in National Electrical Code (NEC) electrical wiring boxes.

Typically, the internal integrated connection circuit 18 will be completed during manufacturing and the various controls 14-17 disposed in the frames/cover/support member 48-48"", 109, 122, 226, 248a, 324, chase 48a, and/or block 47, channel frame 67, so as to minimize the need for on-site electricians doing system wiring at the time of field installation. Instead, electricians would need to simply verify correct connection and terminate electrical load wiring at the time of field installation. Glaziers would typically be the primary installers of the electrically conductive heated glass panel 20 by glazing the wiring 27, 90, the boots, the frames/cover/support member 48-48"", 109, 122, 226, 248a, 324, chase 48a, and panels 30, 40, which should preserve manufacturing integrity and improve reliability of the electrically conductive heated glass panels 20.

Figure 6C:
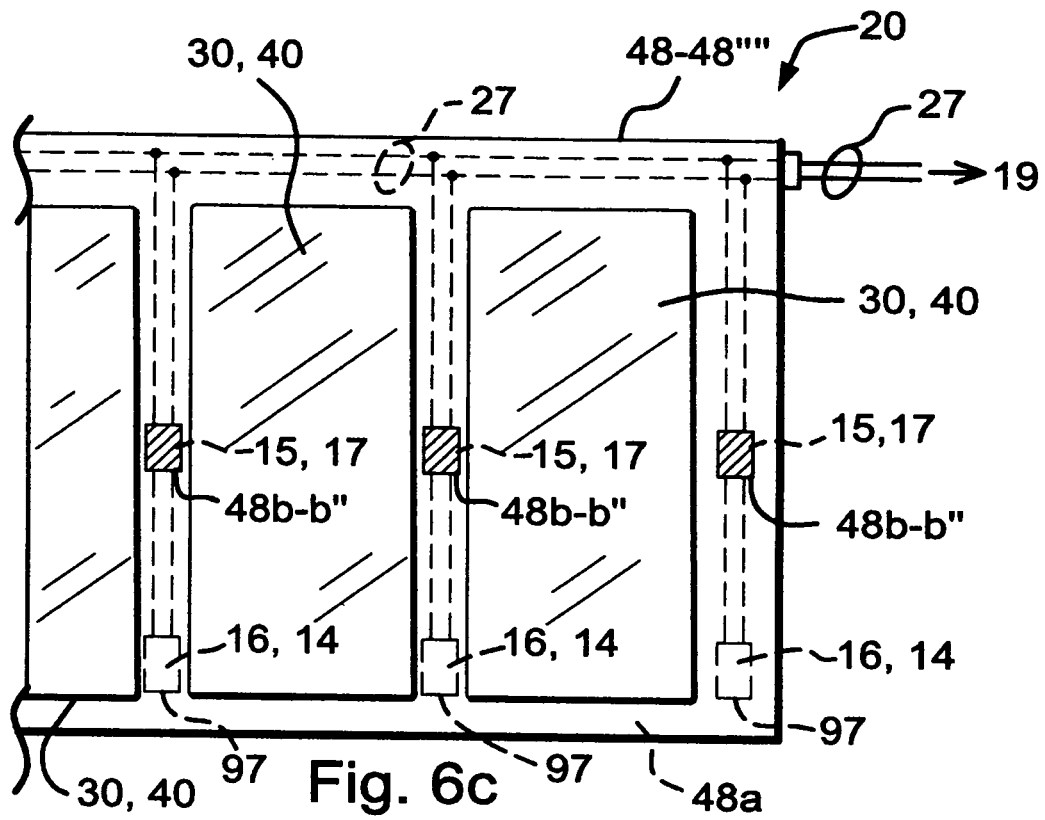
FIG. 6c is a side view of an interconnection of a second set of multiple electrically conductive heated glass panels in accordance with the present invention.
Figure 6D:
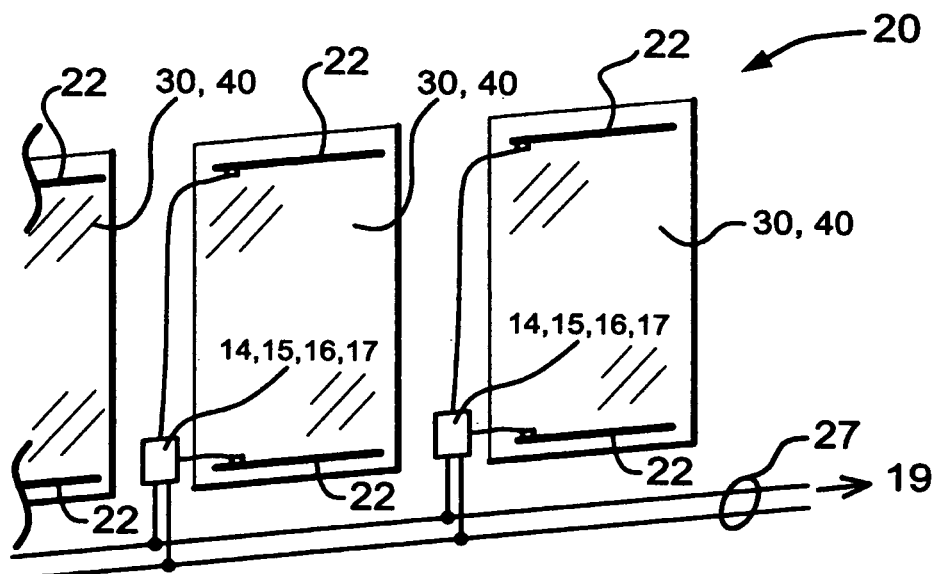
FIG. 6d is a side view of an interconnection of a third set of multiple electrically conductive heated glass panels in accordance with the present invention.
Figure 6E:
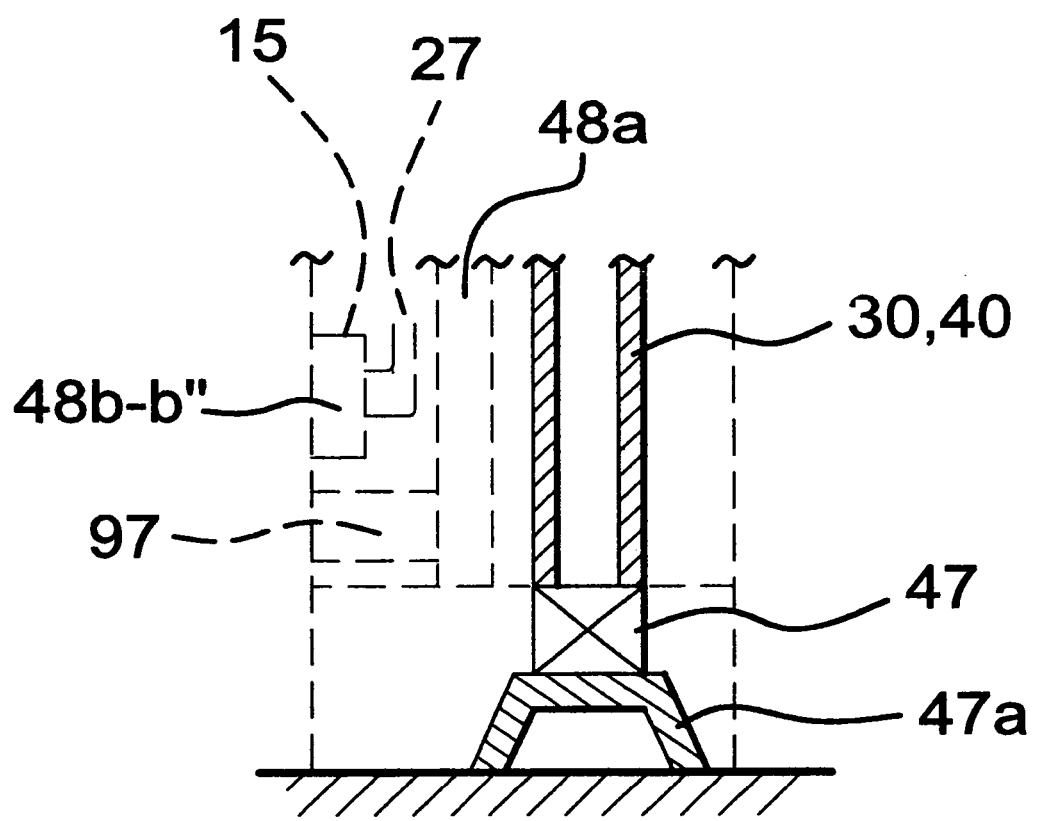
FIG. 6e is a cross sectional view of an electrically conductive heated glass panel at the base of the panel in accordance with the present invention.

Further to these points, FIGS. 6c-e illustrate various configurations of the interconnections 80 of FIG. 6a. In FIGS. 6c, the frames 48-48"" are disposed at the periphery of the panels 30, 40 and the electrical panel wiring 27 delivers electrical power from the alternating power source 19 to the controls 14-17 where thermal contact areas 48b-b" dissipate thermal energy into the environment around the panels 20. Frame chases 48a that are within the frames 48-48"" may be utilized to provide conduit means for the wiring 27 to pass from one panel set 30, 40 to another. The exact placement and orientation of the panels 30, 40, the controls 14-17, the wiring 27, the chases 48a, the thermal contact areas 48b-b", the bus bars 22, and the frames 48-48"" may vary from those shown in FIGS. 6c-e and still remain within the spirit and scope of the present invention.

FIG. 6d illustrates other variations of the placement and orientation of the panel assembly 20. In addition, FIG. 6d depicts the connection of the wiring 27 to the bus bars 22. FIG. 6e illustrates a side view at the base of the panel assembly 30 or 40 that is disposed on the base setting block 47, which in turn is disposed on a setting block chair 47a. Also illustrated in FIG. 6e is the frame chase 48a, where the wiring 27 may be disposed along with the controls 14-17 with a junction box 97 that is utilized to interconnect various panels 20, and the thermal contact areas 48b-b", where thermal energy may be dissipated so as to complement the heating provided by the heated glass panels 30, 40.

FIG. 7 shows a cross sectional view of an installation of a single laminated glass panel 40 within a second glazing channel 60'. However, it can be appreciated that multiple laminated panels 40, multiple insulated glass panels 30, or combinations of the panels 30, 40 could be realized in this aspect of the present invention. Also, these panels 20 may be used in heated glass, switchable glass, and photovoltaic applications. In addition, this aspect may be applied to architectural glazing as well as cladding material.

As shown, the laminated glass panel 40, along with various parts of the second glazing channel 60' are disposed on the channel frame 67. A portion of the laminated glass panel 40 is shown being disposed within the second glazing channel cavity 59' and abutting the channel frame 67, wherein the metallic tab 24 extends beyond the periphery of the panel 40. Mechanically and electrically disposed on the metallic tab 24 is a spade connector 96, which is mechanically and electrically disposed on an end of channel conductor 27.

The channel conductor 27 is shown being disposed within the channel conduit 95, which passes through a coupler 91 to the conductor block 93. Within the conductor block 93 a second end of the channel conductor 27 may be mechanically and electrically disposed on the multiple channel wiring 90 (shown in FIG. 6b) or by conventional means in the art on the channel conductors 27 that are part of the interconnect 80 (shown in FIG. 6a).

Also shown in FIG. 7 are the controls 14-17 which are electrically connected to the wiring 27. These connections may be provided in each of the glazing channels 60, 60', in order to assure the measure of redundancy of the electrical connectivity to the panels 30,40 since maintenance and removal of the panels 30,40 would be tedious and costly.

FIG. 8a illustrates a cross sectional view at the glass panel peripheral edge 37 of the insulated glass panel 30, where the glass sheet 32 and the coated glass sheet 34 are separated by an insulating T-shaped spacer seal 42 (conventionally known as a seal unit) that too is disposed around the periphery 37 therebetween. The insulating T-shaped spacer seal 42 could comprise foamed silicone. In addition, an adhesive sealant 36 is disposed on surfaces of the insulating T-shaped spacer seal 42 where the insulating T-shaped spacer seal 42 makes contact with the glass sheet 32 and the coated glass sheet 34. The adhesive sealant 36 functions to maintain a specified gaseous concentration, preferably at atmospheric pressure, however, any desired pressure may be maintained within a space 38 between the glass sheet 32 and the coated glass sheet 34.

To seal out contaminants and to protect the seal units, the panel frame 48 may be provided that covers the entire seal unit, as it is disposed around the periphery of the insulated glass panel 30. As so described, the glass edge sealing method may not require that the electrically conductive coating 44 be removed from the coated glass sheet 34, which may eliminate the need for "edge deletion" and associated costs. In addition, the controls 14-17 may be disposed within the frame 48, along with the wiring 27. The frame 48 is shown in FIG. 8a having a thermal contact area 48b on a conductive portion of the interior of the frame 48. If heat is to be dissipated on an exterior portion of the frame 48, then the heat is thermally conducted to the outside of a building, room, or facility having the panel 30.

FIG. 8b illustrates a cross sectional view at the glass panel peripheral edge 37 of an insulated glass panel 30' in accordance with the present invention. The application shown in FIG. 8b is similar to that shown in FIG. 8a with the exception that the glass sheet 32 and the coated glass sheet 34 are separated by an insulating E-shaped spacer seal 45 (seal unit) that is disposed around a periphery therebetween. The insulating E-shaped spacer seal 45, having a seal cavity 69, could comprise silicone. The seal cavity 69 may be used as a wiring chase for the placement of interconnecting wiring and for placement of a desiccant, which is used to remove moisture that enters the space 38. The panel frame 48' may be disposed around the E-shaped spacer seal 45, and may have the controls 14-17 and wiring 27 disposed within, and have the thermally conductive area 48b' disposed thereon.

Some preferred applications of the insulated glass panels 30 of FIGS. 8a and 8b would be as architectural panels, such as in glazings for commercial buildings, sports stadium skyboxes, sloped glazing in atria, canopies, general fenestration applications, architectural solar panels and other photovoltaic applications, where the removal of condensation on the surface of glass panels would be accomplished by heating the panels to above a dew point or the utilization of solar layers 120.

If so needed, these applications could utilize the integrated connection circuit 18 of FIG. 1a, where the current-switch circuit 15 would be like that shown in FIG. 2. Due to its design, the current-switch circuit 15 allows the alternating current (I) to be optically isolated from the control circuit 25, wherein the solid-state controller 16 operates the current-switch circuit 15 in the zero-axis crossing manner. The temperature and/or moisture condition sensors 21 would monitor ambient conditions and communicate these conditions to the solid-state controllers 16, in order for the solid-state controllers 16 to command the current-switch circuit 15 to provide the alternating current power source 19 to the electrically conductive heated glass panels 20 for the desired heating of the electrically conductive heated glass panels 20.

In addition to controlling the heating of the insulated glass panels 30, the solid-state controllers 16 would monitor the current (I) passing through the conductive strip switches 26 that would be mounted in the insulated glass panels 30. In the event that the conductive strip switch 26 opens, which could be due to the glass sheet 32 breaking, the current to that electrically conductive heated glass panel 20 would be stopped by the solid-state controller 16, which would remove the possibility that individuals would be exposed to live electrical hazards.

A major advantage of using IG panels 30 with low-E coating 44 as the heating element (as opposed to directly connected resistance coatings) is the large improvement in energy efficiency, where 25% to 30% improvement can be realized, while operating at comparable surface temperatures. These results are due to the improved thermal R-values that result from, for example, double or triple pane IG low-E panels 30. In addition, if the space 38 is filled with argon or krypton, in place of air, the resulting heating from the IG panels 30 is equivalent to base board or other electrical resistance heating methods. Added advantages of the use of low-E IG panels 30 are an allowance of more humidity in the room before the onset of condensation and usability of the area adjacent to the windows in extremely cold climates.

Warming shelves 106, 108 (see, for example, FIG. 11) and other applications of the panels 30 that would be made as those shown in FIGS. 8a, 8b, would have the following advantages: a) the deletion of the coating 44 on the edge 37 is unnecessary, b) superior edge protection is provided by the polymeric T-shaped seal 42 and E-shaped seal 45, and c) the wire chase provided by the seal cavity 69 of the E-shaped seal 45 facilitates dressing of the channel conductors 27.

FIG. 8c depicts a solar IG panel 30" at a peripheral edge 117. FIG. 8c is essentially FIG. 8a with additions/changes of the glass solar layer 120, a spacer tube 36a, a primary seal 23a, a secondary tube 32a, a coating surface 119, and a major surface 121. Again the controls 14-17, wiring, and thermal transfer area 48b''' are disposed within or on the panel frame 48'''.

FIG. 9a illustrates a cross sectional view at the glass panel peripheral edge 37 of the laminated glass panel 40, in accordance with the present invention. The electrically conductive coating 44 is deposited onto the major surface 33 of the glass sheet 32 resulting in the formation of the coated glass sheet 34. In turn, the bus bars 22 are deposited onto the electrically conductive coating 44.

Further, the metallic tab 24 is disposed on the bus bar 22, where a portion of each metallic tab 24 extends beyond the peripheral edge 37 of the laminated glass panel 40. Subsequently, the metal foil 39 is disposed on and in electrical contact with the metallic tab 24, while also being disposed on and in electrical contact with the coating 44 from the peripheral edge 37 of and within the laminated glass panel 40, up to the sight line 29. To complete an assemblage of the laminated glass panel 40 thus described, the parts so stated, are brought together with the glass sheet 32 while the interlayer 46 of polymeric material is disposed therebetween. The interlayer 46 of polymeric material may comprise polyvinyl butyral (PVB).

Some of the preferred applications of the present invention that would use the laminated glass panels would be as heated glass applications in vehicles, aircraft, vessels, and the like, where the removal of condensation and moisture could be achieved on windows, mirrors, and glass parts.

FIG. 9*b* is essentially FIG. 9*a* with the addition of a frame 48″ which has the controls 14-17 and wiring 27 disposed therein and a thermal dissipation area 48*b″* disposed thereon for heat transfer of the heat from the triacs and controls 14-17 to the environment. This is advantageous for the reasons discussed above.

Figure 9C:
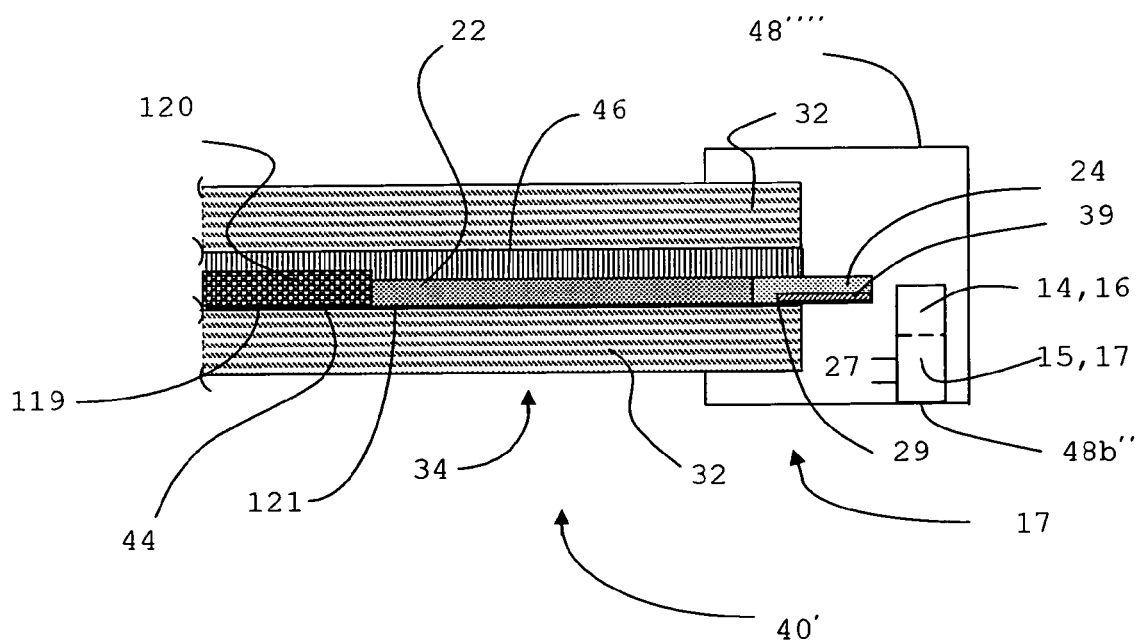
FIG. 9c is a cross sectional view of a laminated glass solar panel at a peripheral edge in accordance with the present invention.

Photovoltaic laminated panels, as those depicted in FIG. 9*c*, absorb light energy in photosensitive material 120 that is disposed on the coated glass sheet 34, convert the absorbed solar energy to electricity, which is conducted through the bus bars 22 and metallic tabs 24 and then on to the external load 126 (see FIG. 1*d-e*). As examples, the external load 126 may be an electrical appliance being powered, a motor being turned, or a battery being charged. A frame 48*b″″* can have the controls 14-17 and wiring disposed therein and the thermal contact area 48*b″* disposed thereon.

Another application of a laminated panel 40 would be as an automotive rear window defogger where the panel 40 would replace individual heater wires. The present invention would provide an invisible, faster, and more even heater replacement for the current heaters.

Further, results from testing indicate that when the panels 30, 40 of the present invention are used in various applications that currently use coil, wire type, and parallel resistance heaters, 40% less energy is required to power the panels 30, 40. This is due in part to the low-E properties, the placement of the coating 44, and the uniformity of the coating. Rear window defoggers and cooking heating elements benefit from this coating heater design.

In addition to glass substrate material, it has also been found that the panels 30, 40 of the present invention may be realized by the use of ceramic and glass-ceramic substrate materials. The coating 44, bus bars 22, and metallic tabs 24 are deposited equally as well as on glass and that certain applications, for example, cooking and warming, may realize aesthetic and cost benefits from the use of ceramic and glass-ceramic materials.

The laminated glass panels 40, as shown in FIGS. 9*a-c*, could be applied where the integrated connection circuit 18 that is shown in FIG. 1*a*, would use moisture and temperature condition sensors 21 to send signals (S) to the solid-state controllers 16, which in turn would communicate with the current-switch circuit 15. The result of the current (I) flowing through the electrically conductive heated glass panel 20 is to heat the glass and mirrors, so as to remove moisture and condensation from the electrically conductive heated glass panel 20.

In addition, through the use of the solid-state controller 16, varying power levels could be provided to achieve functions like defogging and deicing, where more-power is provided for deicing. The voltage and current condition sensors 21 may also be applied to sense glass breakage by the use of the conductive strip switches 26. With the present invention, the solid-state controller 16 may be used in a vehicle to control various electrically conductive heated glass panels 20 having a variety of sizes and geometries to maintain, for example, all such glass panels 20 at one temperature or each glass panel 20 at different temperatures.

With the current-switch circuit 15 being operated in the alternating current, zero-axis crossing manner, those vehicles, for example, automobiles, that only have a direct current power source, would require conventional inverter circuitry to generate the alternating current that is needed for the current-switch circuit 15. However, other vehicles and vessels, for example, emergency vehicles, fire trucks, ships, yachts, trains, and large earth moving vehicles, may have on-board alternating current power sources 19 that would not require the conventional inverter circuitry and could be connected directly to the present invention's integrated connection circuit 18, as illustrated in FIG. 1.

Further applications of the laminated glass panels 40 would have the present invention being utilized in commercial refrigerator/freezer door applications, where the removal of condensation on the surface of the laminated glass panel 40 that is exposed to the cold air inside of the refrigerator or freezer would be accomplished by heating the laminated glass panel 40 to a temperature above the dew point. These applications would utilize the integrated connection circuit 18 of FIG. 1*a*, the laminated glass panels 40 of FIG. 9*a-b*, and the triac circuit 17 of FIG. 2.

Temperature and/or moisture condition sensors 21 would monitor ambient conditions and communicate these conditions to solid-state controllers 16, which in turn command the current-switch circuit 15 to conduct alternating current to the laminated glass panels 40, which would subsequently heat the laminated glass panels 40, thus removing condensation or other forms of moisture.

In addition to controlling the heating of the laminated glass panels 40, the solid-state controllers 16 would monitor current (I) passing through the conductive strip switches 26 that are mounted on coated glass sheets 34. In the event that a conductive strip switch 26 opens, which could be due to a particular laminated glass panel 40 breaking, the current to that laminated glass panels 40 would be disrupted, hence removing the possibility that individuals would be exposed to live electrical hazards. Since the solid-state controller 16 would be monitoring the conductive strip switches 26, it would sense that a particular conductive strip switch 26 had opened and would alert necessary personnel.

Two problems that arise with supplying electrical current to banks of refrigerator/freezer doors that the use of solid-state controllers 16 would overcome, are: (1) the precise electrical control of the uniform low E heating coatings 44 that should result in uniform heating of the laminated glass panels 40 of the banks of refrigerator/freezer doors and (2) the synchronization of the current-switch circuit 15 switching to overcome peak current problems.

Because a bank of laminated glass panels 40 presents a large demand for power, solid-state controllers 16 would be used to provide power demand-based control to avoid brown outs, power peak monitoring to control kilowatt usage costs, and "turning back" of the supply of power in off-hours to also control kilowatt usage costs. Condition sensors 16, other than temperature and moisture, for example, voltage and current, would be used to signal the solid-state controllers 16 for commanding a variety of conventional operations.

Note that the use of electronic controls with both IG panels 30 and laminated panels 40 of the present invention result in higher heating efficiency while using less power than conventional panels and while providing greater safety. This is due to the use of low emissivity coated glass that places the heating element in an advantageous position with respect to the user and items being heated, and provides for less electrical noise generation.

FIG. 10a, which involves the deposition of the bus bars 22 onto the coating 44 that is deposited on the glass sheet 32, illustrates a diagramatic view of a circularly rotating heating head and mask apparatus 50 in accordance with an aspect of the present invention. The bus bars 22, as shown in FIGS. 1a, 1b, and 1c, function to electrically connect the metallic tabs 14, which are the exterior connections for delivering the electrical current (I) to the coating 44 of the glass panels 20. As a result, the current (I) supplied to the coating 44 causes the coating 44 to dissipate heat.

FIG. 10a illustrates the deposition of bus bars 22 on the coated glass sheet 34, which may be deposited through the use of improved deposition methods in accordance with further aspects of the invention. For example, the coating deposition may comprise chemical vapor deposition, where the coating 44 is deposited onto the dielectric substrate material, for example, the glass sheet 32. The coated glass sheet 34 may then be exposed to a preheat zone 70 upstream and, if "edge deletion" is required, the conveyor 88 transports the coated glass sheet 34 to a circular edge mask 66. While moving within the circular edge mask 66, a first area 92 of the coated glass sheet 34 is heated by a coating heater 76. The coating heater 76 could comprise, as examples, an oxyacetylene burner, a plasma device, an electric arc gun, or a flame spray gun.

In the case of the electric arc gun, electrical current is conducted through metal wires that are fed into the electric arc gun in order to melt the metal wire.

In all of the alternatives for the coating heater 76, very high velocity airflow entrains and accelerates the molten metal particles to ensure good adhesion.

In the first area 92, temperatures up to and about 1300 degrees Fahrenheit may be attained in order to heat, thermally shock, and evaporate the electrically conductive coating 44.

Edge deletion may also be achieved without the use of the edge mask 66. This may be accomplished through precise placement of the heat and thermal control and set up of the coating heater 76, such that the coating 44 is precisely thermally shock heated and evaporated. Either of these processes may be required for the IG panels 20 (shown in FIGS. 8a-c) to establish a better surface for sealing in the atmosphere within the space 38.

By either method, a residue of the electrically conductive coating 44 is formed and may, subsequently, be removed by a coating remover 68, which, for example, may be a buffer or a burnishing tool. The coating remover 68 may be required for the IG panels 20 (shown in FIGS. 8a-c) to establish a better surface for sealing in the atmosphere within the space 38. As a result, this process produces a deleted edge 71, as shown in FIG. 10a.

Next, as FIG. 10a also illustrates, the coated glass sheet 34 is conveyed to a circular inner mask 72 and a circular outer mask 74 where a second area 94 of the coated glass sheet 34 is defined therebetween and where dimensional control of the placement, thickness, tapering, and height of the bus bars 22 is achieved. First a reducing flame 78 heats the second area 94 in a stoichiometric atmosphere, where oxidation of a molten metal 64 is controlled during bus bar 22 deposition, while not fracturing or de-tempering the coated glass sheet 34. The reducing flame 78 could comprise oxyacetylene or hydrogen. As a result, the second area 94 is taken to a temperature of about 500 degrees Fahrenheit.

Subsequently, a metal feeding and heating device 62, which is supplied by gas one 82, gas two 84, and gas three 86 feeds conductive metal 56, preferably in the form of a wire (however, the conductive metal could be fed as a powder or in other forms), melts the conductive metal 56, and then propels and impinges particles of the molten metal 64 in a predetermined manner, for example, a uniform manner, onto the second area 94. The metal feeding and heating device 62 preferably comprises a plasma gun, while the three gases 82, 84, and 86 preferably comprise oxygen, air, and acetylene, and the conductive metal 56 preferably comprises copper.

This operation results in the bus bars 22 being uniformly formed on, and adhering strongly to, the electrically conductive coating 44. The formation of the bus bar 22 occurs, for example, near the glass panel peripheral edges 37, before the laminated glass panel 40, as shown in FIGS. 9a-c, or the IG panels 30 and 30', as shown in FIGS. 8a-c, are fully assembled.

Added advantages of the circularly rotating heating head and mask apparatus 50 are that its rotation and size allow for: (1) dissipation of built up heat, (2) the excess molten metal 64 to be scraped, brushed, or blown clean, and (3) accurately depositing the molten metal 64 onto the electrically conductive coating 44 so as to shape the bus bars 22. The shaping of the bus bars 22, if so preferred, may be tapered toward the glass panel peripheral edge 37 and/or tapered on end, as well.

The result of these steps is the production of conductive metal bus bars 22 that are uniformly deposited and have good mechanical bonding to the electrically conductive coating 44, which makes them robust for external connectivity. In addition, the bus bars 22 possess good ohmic conductivity themselves and also in relation to the electrically conductive coating 44.

Further, the circularly rotating heating head and mask apparatus 50 accurately controls the thickness of the resulting copper bus bars 22, so that the thicker the bus bars 22, as shown in FIGS. 1a-e, the higher the electrical current (I) that can be conducted through the bus bars 22, which consequently provides higher electrical current (I) that can be supplied to the glass panel 20 or plurality thereof. In the case of electrically conductive heated glass panels 20, the higher the electrical current (I) that can pass through the electrically conductive heated glass panels 20 the higher the heat that can be dissipated by the electrically conductive heated glass panels 20. Also, the use of copper as the bus bar 22 material is less expensive than silver. However, the present invention may be practiced where silver or other conductive metals comprise the bus bar materials.

An additional advantage of this process is that it allows the bus bars 22 to be deposited after thermal tempering of the electrically conductive heated glass panels 20. Although not wishing to be bound by any theory, it is believed that there is no alloying of the molten metal 64, for example, copper, with the electrically conductive coating 44, since the electrically conductive coating 44 is highly chemically inactive and stable. The electrically conductive coating 44 preferably comprises tin oxide. It has also been found that the deposition of the conductive metal, for example, copper, bus bar 22 will also adhere strongly to the coating 44 as it is disposed on ceramic or glass-ceramic substrates.

To form the bus bars 22, the circularly rotating heating head and mask apparatus 50 of the present invention does not use an aqueous solution. Instead, it heats and shapes the bus bars 22 onto the electrically conductive coating 44 by melting the conductive metal 56, and imparting pressure, through the gasses one 82, two 84, and three 86, to impinge, at a high velocity, the molten metal 64 onto the heated and masked second area 94 on the electrically conductive coating 44.

Further, the metallic tabs 24 may then be readily conductively affixed to external wiring 27 as part of the integrated connection circuit 18. The panel 20, as so constructed may be used for cooking appliances, for example, a heating (conventionally known as a "burner") element. The bus bar deposited panel 20, as thus described, may also be used to form IG panels 30, laminated panels 40, or combination thereof.

Figure 10B:
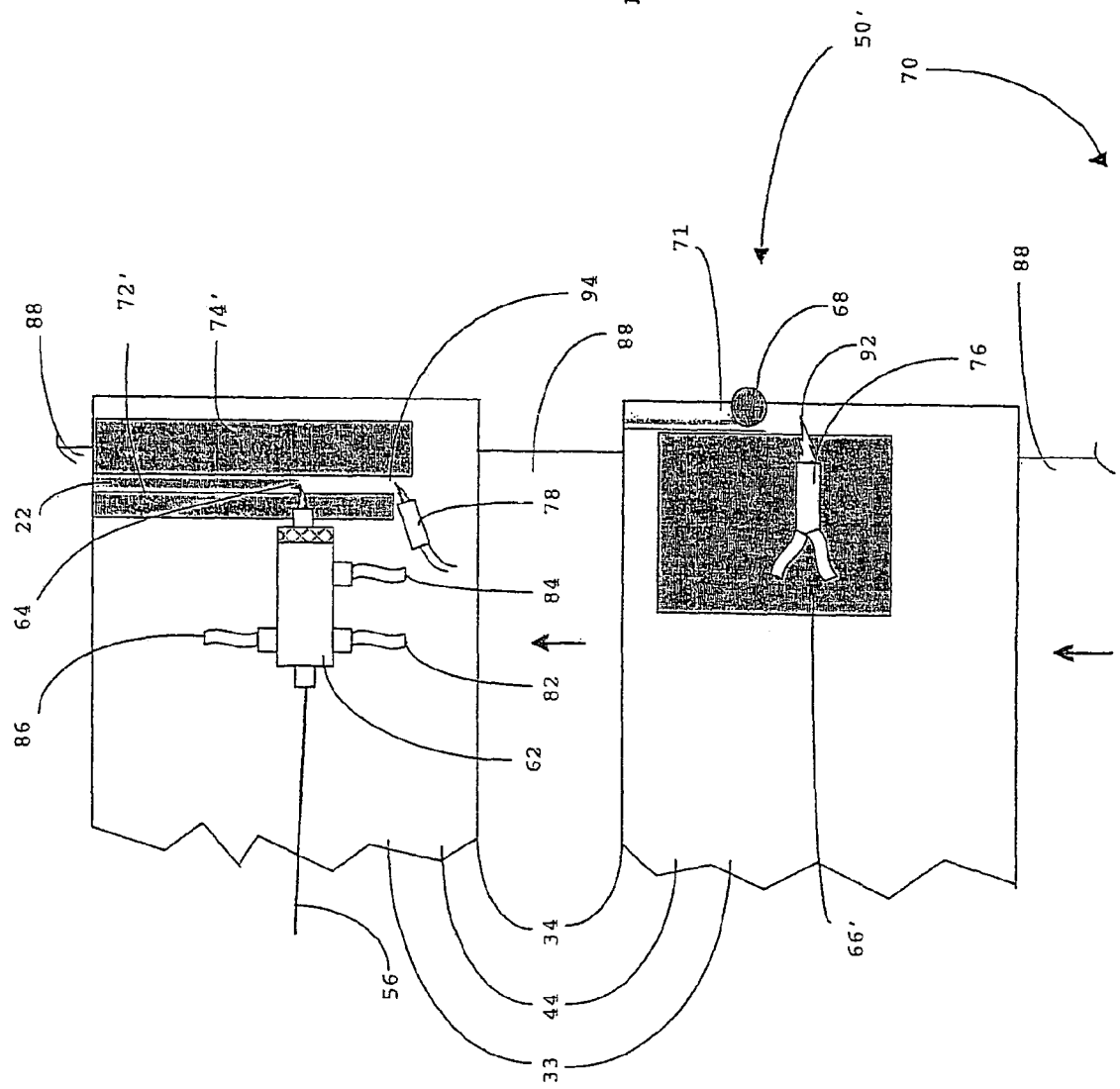
FIG. 10b is a diagramatic view of an inline heating head and mask apparatus in accordance with the present invention.

Illustrated in FIG. 10*b* is an inline heating head and mask apparatus 50' that is also capable of edge deletion and capable of disposing the bus bar 22 on the coated glass sheet 34. If edge deletion is required, the coated glass sheet 34 moves on the conveyor 88 so that the edge of the coated glass sheet 34: a) may be preheated in the preheat zone 70, b) be thermally shocked at the first area 92, and c) have the coating 44 removed by a coating remover 68, which, for example, may be a buffer or a burnishing tool, d) is formed into the deleted edge area 71. This process is the same as that described above for the circularly rotating heating head and mask apparatus 50, with the exception that an inline edge mask 66' replaces the circular edge mask 66.

Note that edge deletion may also be achieved by the apparatus 50, 50' without the use of the edge masks 66, 66'. This may be accomplished through precise placement of the heat and thermal control, and set up of the coating heater 76, such that the coating 44 is precisely thermally shock heated. This process may be required by the IG panels 30 (shown in FIGS. 8*a-c*) to establish a better surface for sealing in the atmosphere within the space 38.

As the coated glass sheet 34 moves further on the conveyor 88, the bus bar 22 can be disposed on the coating 44 in the same manner described above for the circularly rotating heating head and mask apparatus 50, except that an inline inner mask 72' and an inline outer mask 74' are used instead of the circular masks 72 and 74. The inline masks 72' and 74' can also result in the same precise formation of the bus bars 22 as the circularly rotating heating head and mask apparatus 50.

Figure 10D:
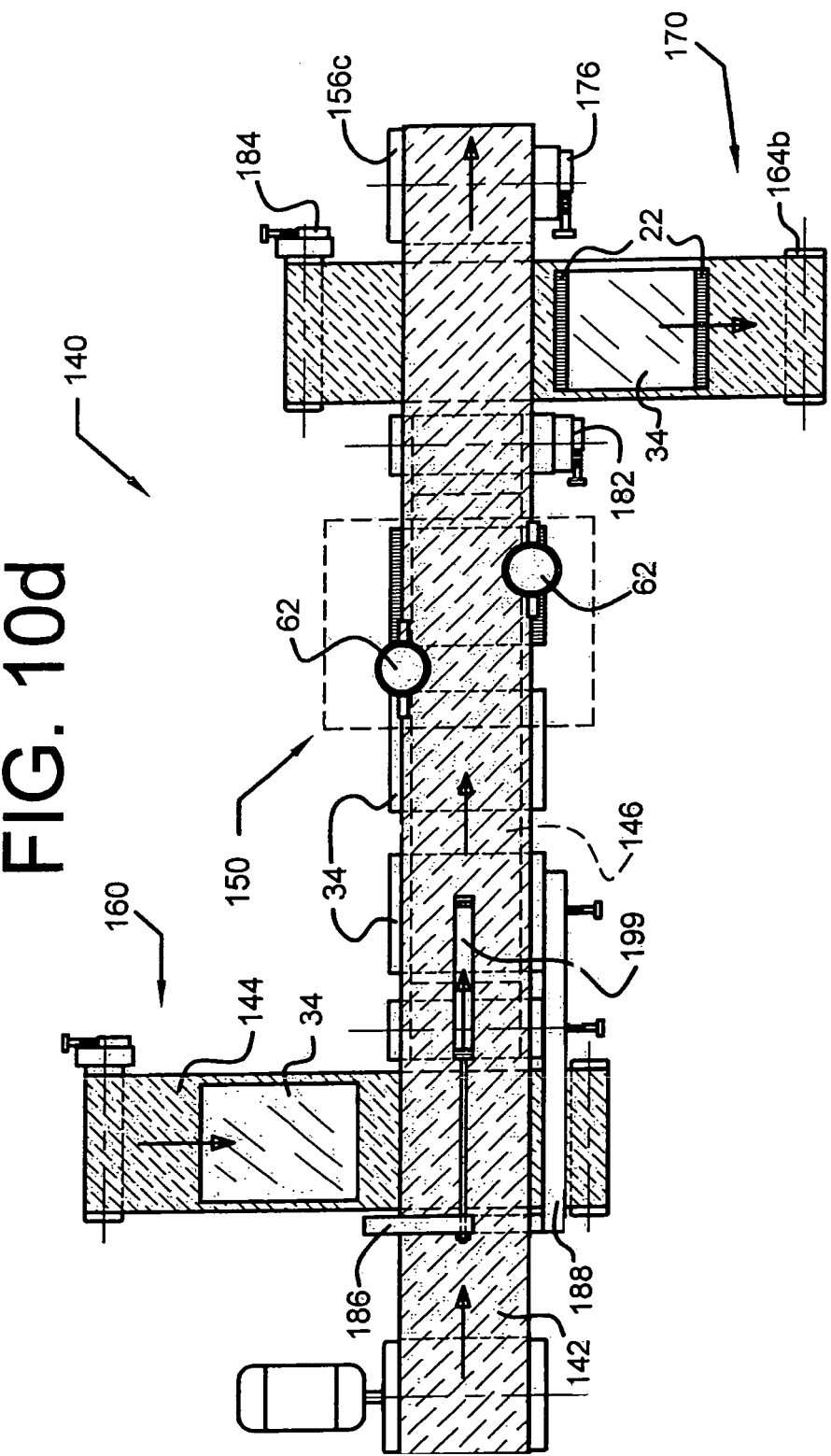
FIG. 10d is a top plan view of the belt based inline heating head and mask apparatus of FIG. 10c.

A variant of the inline heating head and mask apparatus 50' is a dual belt based inline heating head and mask apparatus 140 that is shown in FIGS. 10*c*-10*e*. The apparatus 140 comprises: 1) a work piece input area 160, comprising a first belt 144, first rollers 158, and a first speed and tension adjuster 178, 2) a second belt 142, second rollers 156, and a second tension adjuster 176, and being driven by second motor 154, second motor pulley 172, motor belt two 174, 3) a third belt 146, third rollers 162, and a third tension adjuster 182, and being driven by third motor 152, third motor pulley 166, and motor belt three 168, 4) a thermo spray area 150, 5) a work piece output area 170, comprising a fourth belt 148, fourth rollers 162, and a fourth speed and tension adjuster 184, and 6) an overspray removing device 190.

This inline apparatus 140 may also be practiced by employing other means for driving the belts, for example, sprocket gears and chains, racks and pinions, and the like, while still remaining within the scope and spirit of the present invention.

In operation, an incoming coated glass sheet 34 is conveyed by the first belt 144 to an adjustable stop 188. Note that the coating 44 is on a side of the coated sheet 34 that will make direct contact with the second belt 142. Note also that the stop 188 is capable of adjustment so as to position varying sizes of coated glass sheets 34 at the end of the first belt 144.

Upon reaching the stop 188, the coated glass sheet 34 is positioned inline with a roller area 198 that is between the second belt 142 and the third belt 146 while centrally spanning the second belt 142. The width of the second belt 142 is chosen to be less than the width of the sheet 34 so as to allow the second belt 142 to act as a mask while exposing opposite edges of the coating 44 on the sheet 34.

Subsequently, a cylinder 199 causes an indexer 186 to urge the sheet 34 into the roller area 198 between second belt roller 156*b* and third belt roller 162*a* so as to convey the sheet 34 in a direction toward the thermo spray area 150. Note that the linear speeds of the belts 142, 146 being adjusted to be approximately the same by the respective adjusters 176, 182 and that the sheet 34 is held in place by a clamping force that is imposed by the opposing belts 142, 146. The cylinder 199 may be realized by any means that is conventional in the art to properly push or pull the indexer 186.

Upon reaching the thermo spray area 150, the exposed opposite edges of the sheet 34 may be heated by at least one reducing flame 78 (not shown but similar to those illustrated in FIGS. 10*a*, 10*b*) and impinged by at least one metal feeding and heating devices 62, so as to dispose molten metal 64 onto the opposite edges of the coated sheet 34. The bus bar deposition operation is accomplished in much of the same manner as that used by the circular and inline heating head and mask apparatus 50, 50' and results in the deposition of the bus bars 22 at the opposite edges of the coated glass sheet 32. Ceramic or glass-ceramic sheets may replace the glass sheets.

Following bus bar deposition in the thermo spray area 150, the sheet 34 is conveyed to a fourth belt 148 having fourth belt rollers 164 and fourth speed and tension adjuster 184 and driven by a means (not shown) that is similar to the previously described motor, pulley, and belt, which in turn conveys the sheet 34 to a work piece output area 170. After drop-off of the sheet 34 onto the fourth belt 148, the second belt 142 may be exposed to the overspray removing device 190 in order to remove any conductive metal overspray that may have been deposited on the second belt 142. The overspray removing device 190 may be, for example, a tank containing a coolant 196 and having an outlet 192 and an inlet 194, where the overspray is removed by thermal shock and scraping. However, the present invention may be practiced where the overspray removing device 190 is at least one fan, scraper, or the like.

The dual belt based inline heating head and mask apparatus 140 is designed to produce panels 20 in a fast and simple manner for heating elements, for example, a so-called fifth burner appliance (like a separate cooking appliance that would rest on a counter-top) and cooktop heating elements. In these applications a high speed, low cost process is advantageous and this apparatus 140 is capable of achieving those goals while producing high quality electrical connectivity to the coating 44. However, this apparatus 140 may be used for producing panels other than burner elements, for example, photovoltaic applications.

In the present invention, the masks 66, 66', 72, 72', 74, 74', 142 may comprise steel with a layer of chrome plating disposed on the steel. This has been found to inhibit the adhesion of copper and other metals to the masks 66, 66', 72, 72', 74, 74', 142 thus allowing a simple spring loaded scraper to continually clean the overspray from the masks 66, 66', 72, 72', 74, 74', 142 during production of the bus bars 22. This operation allows the overspray and dust of the conductive metal 56 to be collected and re-sold. The present invention may further deposit soft electrically conductive materials (not shown) that include metal and metal oxides, often in combination with each other, onto the bus bars 22, following bus bar deposition to the coating 44.

Examples of the soft conductive materials are silver based systems like (metal oxide/silver/metal oxide) and variants including double silver stacks and indium-tin-oxide (known as ITO.) All constructs of the bus bars 22, metallic tabs 24 and the panels 20 that have been disclosed herein apply with the addition of the deposition of the soft conductive materials.

The soft coatings may be deposited in a vacuum deposition process like that produced by DC Magenetron Sputtering after the bus bars 22 are deposited on the coatings 44. For example, these soft coatings may be copper traces that would conduct electrical current to electrical components that would be mechanically attached to the glass sheet 32 or coated glass sheet 34. An example electrical component would be a capacitive moisture sensing unit on the sheet 32, 34.

Figure 11:
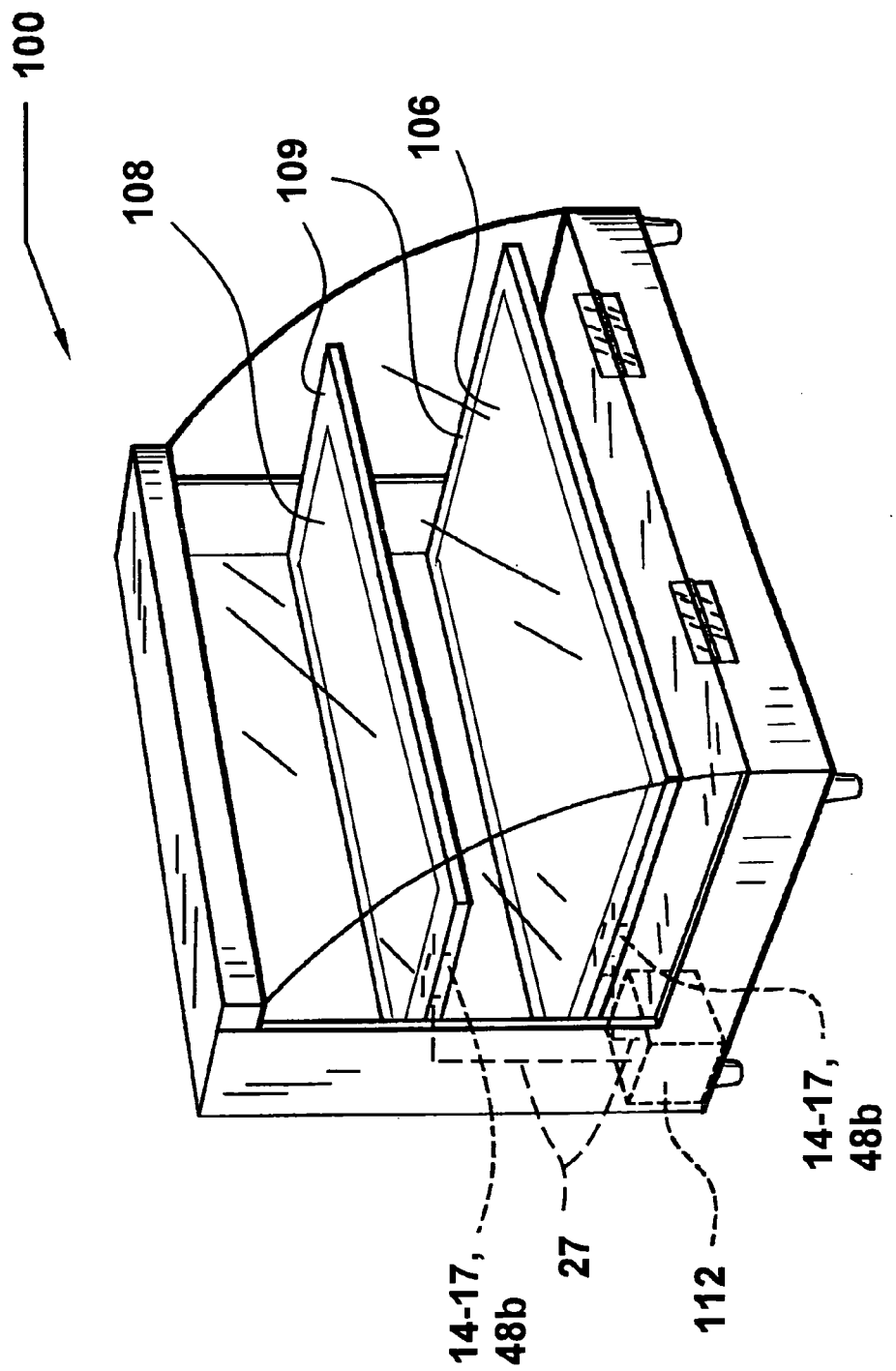
FIG. 11 is a perspective view of a warming oven in accordance with the present invention.

Another example of the present invention being used as an appliance is illustrated in FIG. 11, which is a perspective view of a warming oven 100. The warming oven 100 would have at least a first warming shelf 106, however, FIG. 11 shows the warming oven 100 with the first warming shelf 106 and an accompanying second warming shelf 108. The warming shelves 106, 108 would comprise insulated glass panels 30, wherein the bus bars 22 and metallic tabs 24 have been formed thereon in the manner described above in the present invention. The control of the warming of items placed in the warming oven 100 would be accomplished by the oven controls 112, which would comprise the elements of the integrated connection circuit 18.

As also shown in FIG. 11, the warming shelves 106 and 108 can each have a warming shelf frame 109 disposed on a periphery thereof. Disposed in the frames 109 can be the direct current power supply 14 (if necessary), the current switch circuit 15, the electronic controller 16, and/or the triac circuit 17 that would be electrically connected to the oven control 112 by the wiring 27. The warming shelves 106,108 can also have the thermal conductive areas 48b that would be capable of thermally conducting the triac and control heat to complement the heat generated by the warming shelves 106, 108.

An added advantage of the use of the insulated glass panel 30 in the warming oven 100 is that the insulated glass panel 30 affords physical separation between the coating 44 and the item being thermo-conductively warmed, wherein capacitive coupling and leakage currents from the heating coating to the item being heated are virtually eliminated, thus eliminating electrical shock potential and spark ignition for a fire.

Figure 12:
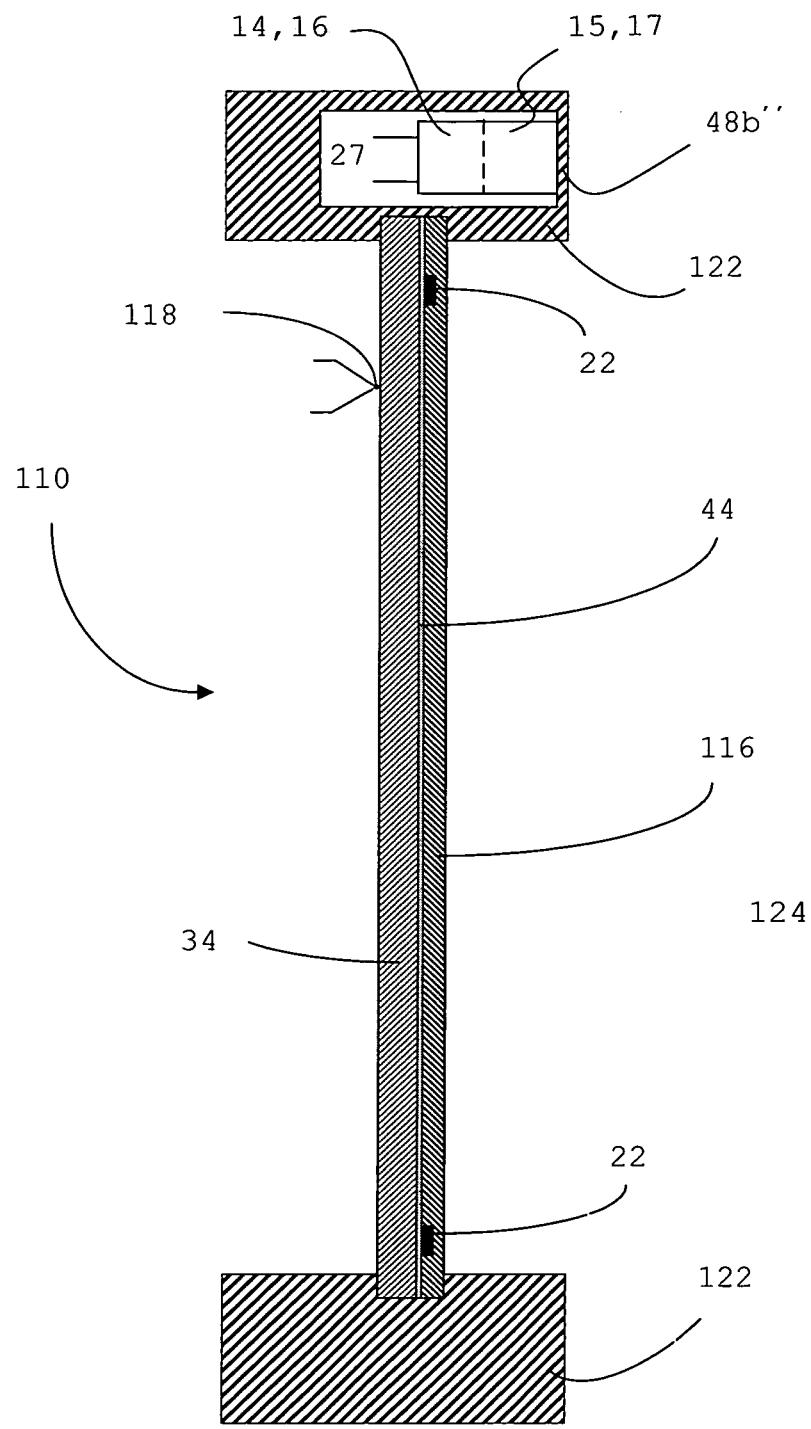
FIG. 12 is a cross sectional view of an oven door panel in accordance with the present invention.

FIG. 12 illustrates another aspect of the present invention, where there is shown an oven door panel 110, which is mounted in an oven door frame 122 for viewing food items being cooked in an oven interior 124. This aspect of the present invention utilizes an assembly comprising a temperature sensing means, for example, rapid measurement of the voltage across the bus bars 22 (as discussed above in conjunction with the controller 16) or a temperature switch 118 disposed on the exterior of the coated glass sheet 34, with bus bars 22, for example, copper, disposed on the coating 44 (in the manners described above for the present invention), and a thermally activated light scattering material 116 disposed on the coating 44. The light scattering material 116 may comprise, for example, ThermoSEE™ which is commercially available from Pleotint LLC, West Olive, Mich.

The temperature switch 118 would be part of the integrated connection circuit 18 for the oven (not shown) and would function to sense the exterior temperature of the oven door panel 110. If the exterior temperature of the oven door panel 110 would exceed a setpoint temperature, the temperature switch 118 would electrically open, which in turn would cut off current (I) to conventional oven heating elements (not shown), so as to eliminate the possibility of burning a person that might touch the exterior surface of the oven door panel 110.

The bus bars 22, which may be connected to and controlled by the integrated connection circuit 18, by way of the metallic tabs 24 that are disposed on the bus bars 22 and electrically connected to the channel conductors 27, are used to precisely control the heating of the oven door panel 110 so as to precisely control the opacity of the light scattering material 116, which is opaque at room temperature and up to a temperature of about 150 degrees F., at which temperature and above, the light scattering material 116 becomes essentially transparent. As a result, the contents of the oven interior 124 can be viewed from outside of the oven under the precise control of the integrated connection circuit 18 of the present invention or by conventional means in the art.

As also shown in FIG. 12, the oven door frame 122 can have the direct current power supply 14 (if necessary), the current switch circuit 15, the electronic controller 16, and/or the triac circuit 17 disposed therein. The oven door frame 122 can also have the thermal conductive area 48b" that would be capable of thermally conducting the triac and control circuit heat to complement the heat generated within the oven interior 124.

Figure 13:
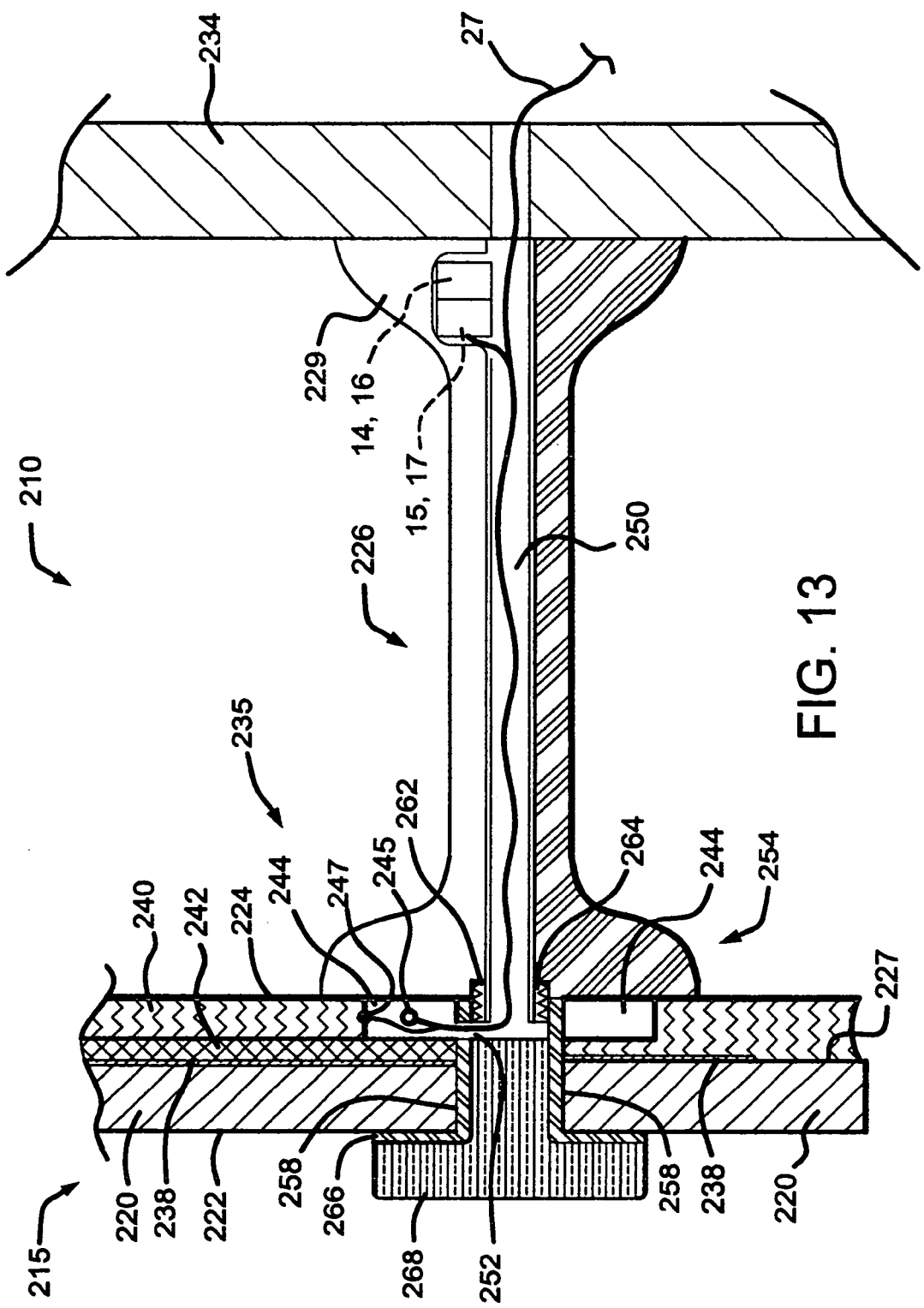
FIG. 13 is a cross sectional view of a cloth heater in accordance with the present invention.
Figure 15:
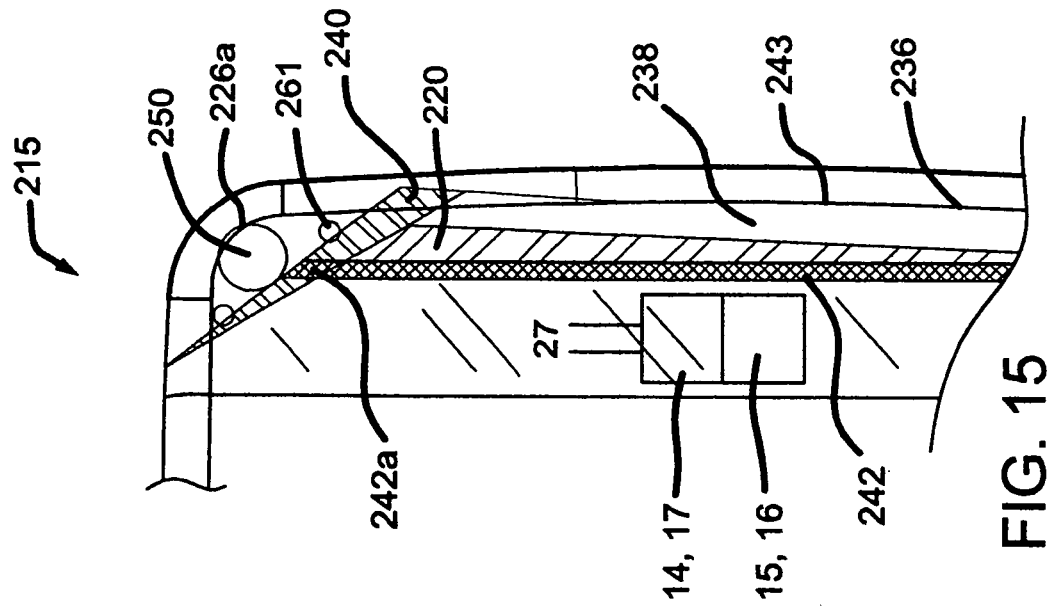
FIG. 15 is the cloth heater of FIG. 14 with a cover removed.
Figure 14:
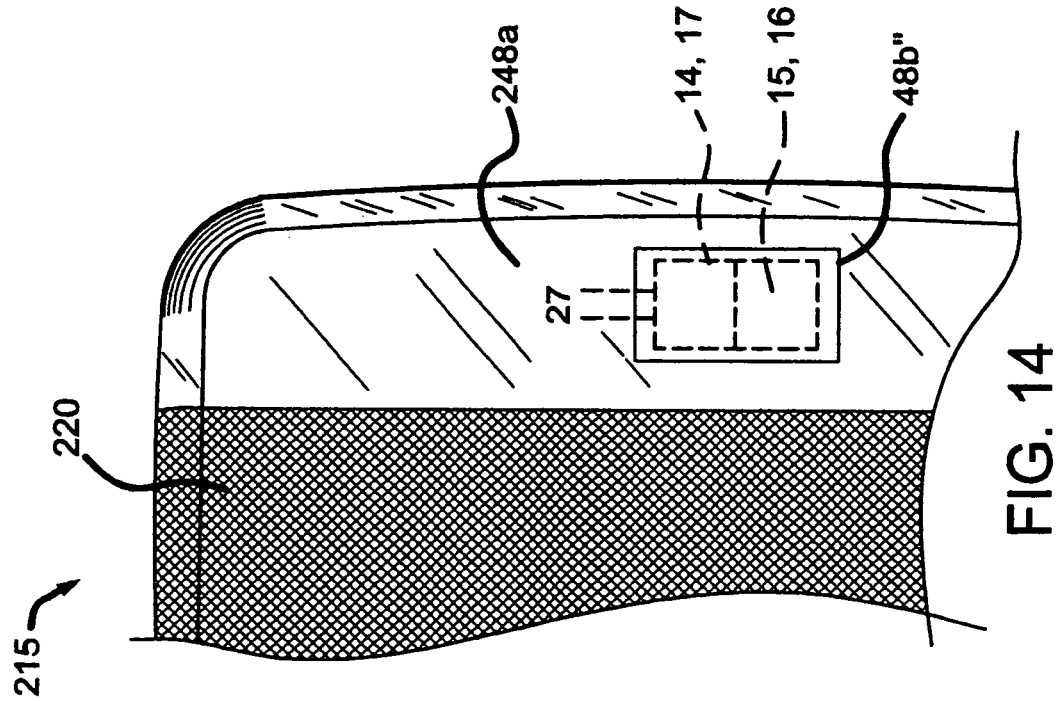
FIG. 14 is a top view at a corner of the cloth heater of FIG. 13.
Figure 16:
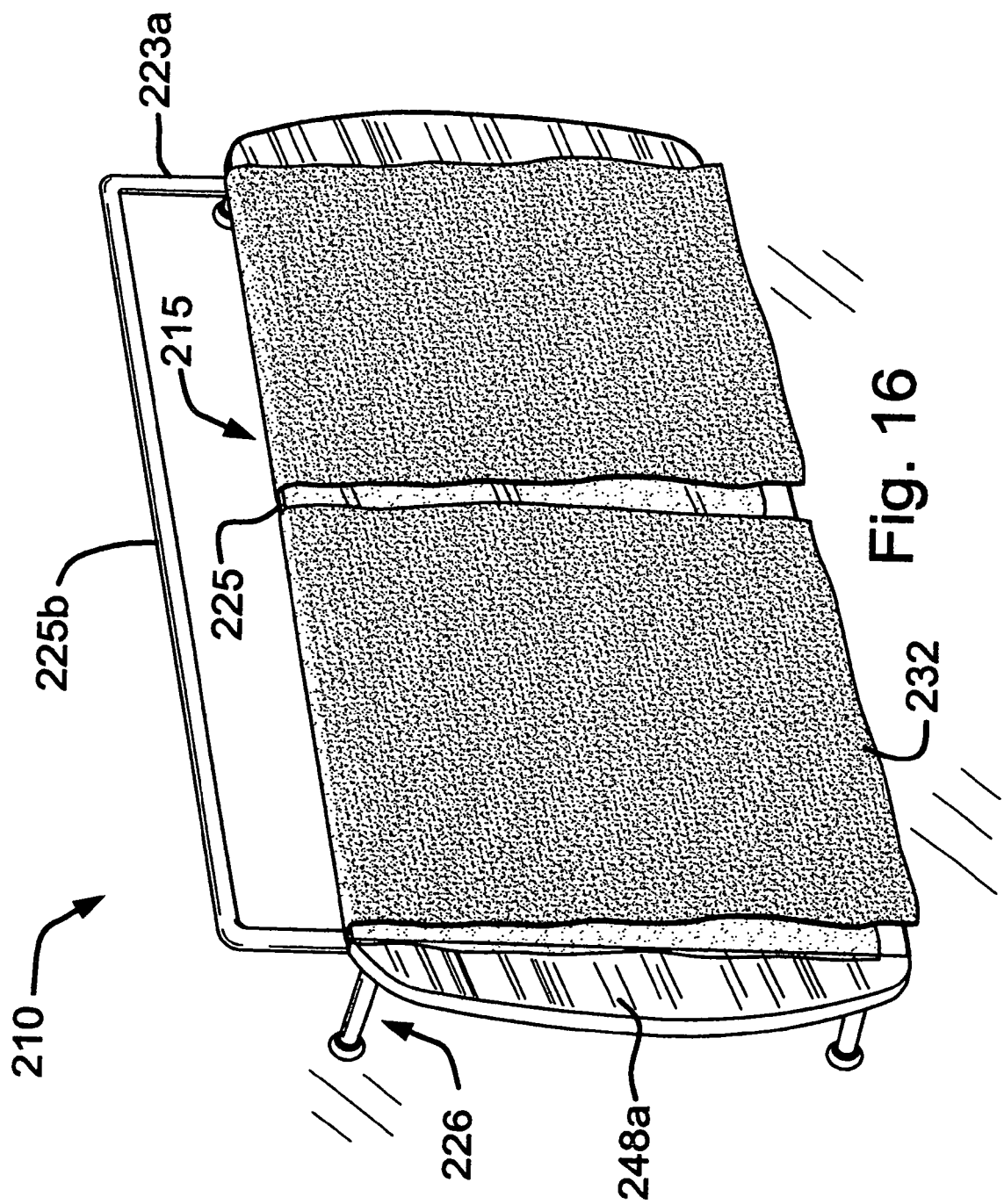
FIG. 16 is a frontal three dimensional view of the cloth heater of FIG. 13.

Another aspect of the present invention would be a cloth heater 210, which is illustrated in FIG. 16 and detailed in FIGS. 13-15. The cloth heater 210 is more thoroughly described in U.S. Utility patent application Ser. No. 10/936, 848, which was filed on Sep. 9, 2004 and is incorporated by reference herein.

Referring to FIG. 16, there is shown the cloth heater 210 comprising support members 226, a laminated heated panel 215, panel covers 248a, a first horizontally disposed edge 225, a rack 223a with a second horizontally disposed edge 225b. Two cloths 232 are disposed across the first horizontally disposed edge 225, which are capable of being warmed by the laminated heated panel 215.

FIG. 13 illustrates a sectional view through one of the support members 226 of the cloth heater 210. The support member 226 being disposed at a support member base 229 on a wall or structure 234, while the support member 226 supports two opposing laminated dielectric sheets 220, 240 and their respective opposing major surfaces 222, 224. The first sheet 220 has a rear surface 227, where a conductive coating 238 is disposed, which has a bus bar 242 disposed thereon.

A securing device 268 attaches the support member 226 to the panel assembly 215 at a free end 254 of the support member 226, by protruding through an aperture 258 in the panel assembly 215 and being threaded to the support member 226 by cooperating threads 262, 264. An insulating sleeve 266 assures that the securing device 268 is electrically isolated from the electrical current passing through the heater 210 and the heat generated in the heater 210.

Electrically, a conductive ring 244 is provided with a connecting point 245 for connecting the wiring 27 to the bus bar 242 and an optional sensor 247. The wiring 27 passes from the ring 244, through an aperture 252 in the securing device 268, and on through a tubular passage 250 in the support member 226. As a discovery of the present invention, the wiring 27 may be connected to the controls 14-17 that may be disposed in the support member. The wiring 27 would then be connected to the external power source.

FIG. 14 illustrates the heated panel 215 at a front corner, where a cover 248a covers one of the sides of the dielectric material 220. Also illustrated is a discovery of the present invention where the controls 14-17 may be disposed beneath the cover 248a and the thermal transfer area 48b" is disposed on the cover 248a, while providing for a way for heat generated by the controls 14-17 to be transferred to the environment outside of the cloth heater 210. Thus, the control heat may be utilized to complement the heat provide by the heating of the panel 215. In addition, the cover 248a hides the controls 14-17 out of sight.

FIG. 15 provides more details of those items that are hidden below the cover 248a, where the cover 248a has been removed. The tubular passage 250 of the support member 226 is shown, where wiring 27 may be disposed therethrough. Mounting means 261, for example, adhesives, screws, and the like, may be utilized in place of the securing device 268. The dielectric material 220, the conductive coating 238, the dielectric material's perimeter edge 236, and the bus bar 242 are further illustrated from a frontal view. A small bus bar portion 242a is shown, where the wiring 27 may be attached to the bus bar directly. Also illustrated in FIG. 15 are the controls 14-17 and associated wiring 27 being disposed in the cover 248a.

In accordance with the provisions of the patent statutes, the principles and modes of operation of this invention have been described and illustrated in its preferred embodiments. However, it must be understood that the invention may be practice otherwise than specifically explained and illustrated without departing from its spirit or scope.

What is claimed is:

1. A heated glass panel assembly, comprising:
   a panel comprised of at least one of an insulated glass panel, a laminated glass panel, and a single glass panel, the panel having a conductive coating disposed thereon;
   a member comprised of at least one of a frame, a cover, a chase, and a mounting member, the member being disposed on a periphery of the panel; and
   at least one triac disposed within the member and in direct thermal contact with a thermally conductive area of the member.

2. The heated glass panel assembly of claim 1, wherein the thermally conductive area comprises a thermally conductive metal.

3. The heated glass panel assembly of claim 1, further comprising an electronic controller in electrical communication with the conductive coating, the electronic controller being disposed within the member.

4. The heated glass panel assembly of claim 3, further comprising wiring disposed within the member, wherein the wiring is utilized to electrically connect at least the controller to the triac, the assembly to electrical power, and the assembly to other assemblies.

5. The heated glass panel assembly of claim 3, wherein the controller is part of an integrated connection circuit.

6. The heated glass panel assembly of claim 1, wherein the panel is an architectural panel.

7. The heated glass panel assembly of claim 1, wherein the panel is a solar panel capable of supplying electricity to an electrical appliance, a motor, or a battery.

8. The heated glass panel assembly of claim 1 wherein the panel is a warming oven shelf.

9. The heated glass panel assembly of claim 1, wherein the panel is an oven door.

10. The heated glass panel assembly of claim 1, wherein the panel is a cloth heater.

11. The heated glass panel assembly of claim 1, wherein the mounting member is a base setting block.

12. The heated glass panel assembly of claim 1, wherein the triac is capable of providing at least 9 watts per square foot for heating a room by way of the thermally conductive area of the member.

13. An assembly of heated glass panels, comprising:
    at least two panels, wherein each panel is comprised of at least one of an insulated glass panel, a laminated glass panel, and a single glass panel, each panel having a conductive coating disposed thereon;
    at least two members, wherein each member is comprised of at least one of a frame, a cover, a chase, and a mounting member, each member being disposed on a periphery of a corresponding one of the at least two panels; and
    at least one triac disposed within each member, each triac being in direct thermal contact with a thermally conductive area of a corresponding member.

14. The assembly of heated glass panels of claim 13, wherein the thermally conductive area of each member comprises a thermally conductive metal.

15. The assembly of heated glass panels of claim 13, further comprising at least one electronic controller disposed within each member and in electrical communication with a corresponding conductive coating and a corresponding triac.

16. The assembly of heated glass panels of claim 15, further comprising wiring disposed within each member, the wiring being utilized to at least electrically connect the triac to the controller, to electrically connect electrical power to the panels, and to electrically connect the panels together.

17. A method, comprising:
    providing a panel comprised of at least one of an insulated glass panel, a laminated glass panel, and a single glass panel, the panel having a conductive coating disposed thereon;
    providing a member comprised of at least one of a frame, a cover, a chase, and a mounting member, the member being disposed on a periphery of the panel;
    providing at least one triac disposed within the member and in direct thermal contact with a thermally conductive area of the member; and
    directly thermally conducting heat from the triac to the thermally conductive area of the member, thereby transferring triac heat to an area exterior to the member.

18. The method of claim 17, further comprising disposing at least one electronic controller within each member, the electronic controller electrically communicating with the conductive coating and the triac.

\* \* \* \* \*